United States Patent
Ren et al.

(10) Patent No.: US 11,812,007 B2
(45) Date of Patent: Nov. 7, 2023

(54) DISPARITY MAP BUILDING USING GUIDE NODE

(71) Applicant: Ambarella International LP, Santa Clara, CA (US)

(72) Inventors: Ke-ke Ren, ShangHai (CN); Zhi He, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 366 days.

(21) Appl. No.: 17/146,985

(22) Filed: Jan. 12, 2021

(65) Prior Publication Data

US 2022/0210388 A1    Jun. 30, 2022

(30) Foreign Application Priority Data

Dec. 30, 2020    (CN) .......................... 202011606702.6

(51) Int. Cl.
| | |
|---|---|
| *H04N 13/128* | (2018.01) |
| *G06T 7/593* | (2017.01) |
| *H04N 13/239* | (2018.01) |
| *H04N 13/00* | (2018.01) |

(52) U.S. Cl.
CPC .......... *H04N 13/128* (2018.05); *G06T 7/593* (2017.01); *H04N 13/239* (2018.05); *G06T 2207/10021* (2013.01); *G06T 2207/20228* (2013.01); *H04N 2013/0081* (2013.01)

(58) Field of Classification Search
CPC ............... H04N 13/128; H04N 13/239; H04N 2013/0081; H04N 13/246; G06T 7/593; G06T 2207/10021; G06T 2207/20228; G06T 5/006; G06T 2207/20081; G06F 18/24; G06N 3/045; G06N 3/08; G06N 20/00
USPC .................................. 382/154, 104; 348/42
See application file for complete search history.

(56) References Cited

U.S. PATENT DOCUMENTS

| | | | |
|---|---|---|---|
| 2004/0165765 A1* | 8/2004 | Sung ....................... | G06V 10/10 382/154 |
| 2011/0149024 A1* | 6/2011 | Tsukagoshi ........ | H04N 21/2381 348/E13.001 |
| 2011/0188736 A1* | 8/2011 | Xu .......................... | G06T 7/593 382/199 |
| 2012/0200565 A1* | 8/2012 | Tsukagoshi .......... | H04N 21/816 345/419 |

(Continued)

*Primary Examiner* — Kathleen Y Dulaney
(74) *Attorney, Agent, or Firm* — Christopher P. Maiorana, PC

(57) ABSTRACT

An apparatus including an interface and a processor. The interface may be configured to receive pixel data. The processor may be configured to generate a reference image and a target image from the pixel data, perform disparity operations on the reference image and the target image and build a disparity map in response to the disparity operations. The disparity operations may comprise selecting a guide node from the pixel data comprising a pixel and a plurality of surrounding pixels, determining a peak location for the pixel by performing a full range search, calculating a shift offset peak location for each of the surrounding pixels by performing block matching operations in a local range near the peak location and generating values in a disparity map for the pixel data in response to the peak location for the pixel and the shift offset peak location for each of the surrounding pixels.

20 Claims, 11 Drawing Sheets

(56) References Cited

U.S. PATENT DOCUMENTS

| | | | |
|---|---|---|---|
| 2014/0139644 A1* | 5/2014 | Ueda | H04N 13/218 |
| | | | 348/49 |
| 2015/0199818 A1* | 7/2015 | Einecke | G06V 10/751 |
| | | | 382/104 |
| 2022/0237736 A1* | 7/2022 | Wang | G06T 3/0018 |

* cited by examiner

DISPARITY MAP BUILDING USING GUIDE NODE

This application relates to China Patent Application No. 202011606702.6, filed on Dec. 30, 2020, which is hereby incorporated by reference in its entirety.

FIELD OF THE INVENTION

The invention relates to stereo vision generally and, more particularly, to a method and/or apparatus for implementing disparity map building using guide node.

BACKGROUND

Stereo vision is a popular technology. Stereo vision utilizes a pair of cameras at a known distance and angle with respect to each other. By comparing the disparity between the two images generated by the pair of cameras using the known distance and angle between the cameras, valuable information can be determined such as a distance to an object. Stereo vision is widely used in technologies such as 3D reconstruction, autonomous driving, stereo object recognition, etc.

Disparity maps are a prevalent option for displaying stereo vision. Disparity maps are a 2D vector that shows the difference of a horizontal axis position between one pixel in a reference image and matching pixel in a target image. For example, a target image and the reference image are offset from each other based on the known distance and angle between the pair of cameras resulting in similar pixel data being located at different locations. A pixel in a reference image at location x0,y and the same pixel in the target image at location x1,y may result in a disparity of x1−x0.

Generating disparity maps is computationally expensive, which can limit real-time availability of disparity maps and/or have high power requirements for implementation. Particularly for real-time applications such as autonomous driving, disparity maps should be generated quickly and accurately. Conventional techniques for generating disparity maps have a trade-off between quick matching and exact matching. One conventional method for building disparity maps is Block Matching, which is simple and fast, but results in a high number of mismatches (i.e., noisy disparity maps). Another method for building disparity maps is Semi-Global Block Matching, which has fewer mismatches, but is complex and operates slowly (i.e., limited usage). Block Matching and Semi-Global Block Matching are only capable of building disparity maps at pixel level accuracy, but not sub-pixel level accuracy without post-processing. Building disparity maps with pixel level accuracy can result in waveform distortions in the disparity maps.

It would be desirable to implement disparity map building using guide node.

SUMMARY

The invention concerns an apparatus including an interface and a processor. The interface may be configured to receive pixel data. The processor may be configured to generate a reference image and a target image from the pixel data, perform disparity operations on the reference image and the target image and build a disparity map in response to the disparity operations. The disparity operations may comprise selecting a guide node from the pixel data comprising a guide node pixel and a plurality of surrounding pixels, determining a guide node pixel peak location for the guide node pixel by performing a full range search in the reference image and the target image, calculating a shift offset peak location for each of the surrounding pixels in the guide node by performing block matching operations in a local range near the guide node pixel peak location and generating values in a disparity map for the pixel data in the guide node in response to the guide node pixel peak location for the guide node pixel and the shift offset peak location for each of the surrounding pixels.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
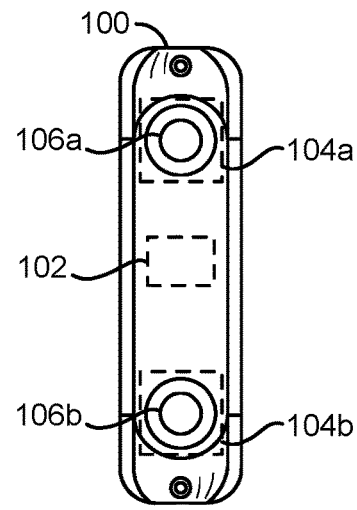
FIG. 1 is a diagram illustrating a stereo camera in a vertical orientation.

Embodiments of the present invention include providing disparity map building using guide node that may (i) build disparity maps quickly, (ii) build disparity maps accurately, (iii) build disparity maps at a sub-pixel level, (iv) eliminate waveform distortions in stereo vision, (v) enable real-time stereo vision with low power consumption, (vi) use guide nodes to enable local range matching for surrounding pixels, (vii) model a paracurve for calculating a shift offset between a reference image and a target image, (viii) operate 20-30 times faster than block matching by reducing computational complexity, (ix) perform a full range search with a center pixel of a guide node and a local range search for surrounding pixels near the peak location of the guide node and/or (x) be implemented as one or more integrated circuits.

Embodiments of the present invention may be configured to operate in systems implementing stereo vision. Disparity maps may be generated by using guide nodes. The guide nodes may limit the amount of computations performed to determine a shift offset between a reference image and a target image. The reference image and the target image may be video frames generated by a stereo camera (e.g., a camera comprising a pair of lenses arranged in a pre-determined orientation).

Embodiments of the present invention may be configured to build disparity maps at sub-pixel level accuracy. Building the disparity maps at sub-pixel level accuracy may prevent waveform distortions. The disparity maps generated using the guide nodes may enable sub-pixel level accuracy without post-processing.

Using guide nodes to build the disparity maps may reduce the amount of calculations performed compared to performing a full range search to determine a shift offset between the reference image and the target image. Compared to Block Matching (e.g., BM) techniques (e.g., using a full range search for every pixel), using guide nodes may enable the disparity maps to be built 20 times to 30 times faster (e.g., built in less time). Using guide nodes may also result in less noise in the disparity maps compared to BM techniques. The guide nodes may reduce and/or eliminate waveform distortions in stereo vision performed in response to the disparity maps.

Embodiments of the present invention may implement guide nodes to determine peak locations for local range matching of surrounding pixels. The local range matching may be implemented to reduce a number of computations compared to a full range search while preventing mismatches when determining the shift offset between the reference image and the target image. Preventing mismatches (e.g., reducing a number of mismatches compared to BM techniques) may enable the disparity maps to be built with less noise compared to BM techniques.

The local range matching may be implemented in response to determining a peak location of the guide nodes. A full range search may be performed for determining a peak location (e.g., a guide node peak location) for a center pixel of the guide node. The local range search may be performed for each of the pixels surrounding the center pixel (e.g., surrounding pixels) of the guide node. The local range searching may be performed on a number of blocks of pixels. In an example, three blocks of pixels may be used for the local range searching. The blocks of pixels may be compared between the target image and the reference image to determine matching scores. The matching scores may be used to model a paracurve. A peak of the modeled paracurve may be used to calculate a matching location. The matching location may be used to determine a disparity value for building the disparity maps. The disparity value calculated may be at a sub-pixel level.

Performing the full range search for the center pixel in a guide node may comprise the same number of computations as performing a full range search using BM techniques. Using the local range near the guide node peak location to determine the peak location may comprise a fewer number of computations compared to performing a full range search for every pixel in the reference image (e.g., using BM techniques).

Referring to FIG. 1, a diagram illustrating a stereo camera in a vertical orientation is shown. An apparatus (or device or module) 100 is shown. The apparatus 100 may implement a camera system. The camera system 100 may implement a stereo camera. The stereo camera 100 may have different styles and/or use cases. For example, the stereo camera 100 may be an action camera, a ceiling mounted security camera, a webcam, trail camera, a vehicle mounted camera, a security camera, a battery powered camera, a doorbell camera, etc. The design/style of the stereo camera 100 may be varied according to the design criteria of a particular implementation.

The stereo camera 100 may comprise a block (or circuit) 102, blocks (or circuits) 104a-104b and/or blocks (or circuits) 106a-106b. The circuit 102 may implement a processor. The circuits 104a-104b may implement capture devices. The circuits 106a-106b may implement lenses. The stereo camera 100 may comprise other components (not shown). Details of the components of the stereo camera 100 may be described in detail in association with FIG. 3.

The processor 102 may be configured to generate video frames in response to pixel data. The pixel data may be captured by the capture devices 104a-104b. The processor 102 may be configured to perform various types of operations on the video frames generated. The processor 102 may be configured to detect objects and/or analyze characteristics of the objects detected in the video frames. In an example, the processor 102 may be configured to perform computer vision operations to detect objects in the video frames (e.g., vehicles, trees, pedestrians, street signs, pets, debris on the lenses 106a-106b, etc.).

The capture devices 104a-104b and the lenses 106a-106b are shown implemented as a stereo pair. The lenses 106a-106b may be implemented at a pre-determined distance apart from each other. The lenses 106a-106b may be implemented to be angled inwards (e.g., slightly directed towards a center of the stereo camera 100 so that a straight line projected from the lenses 106a-106b would eventually intersect at a pre-determined distances away from the lenses 106a-106b). The pre-determined distance apart and the pre-determined angle of the lenses 106a-106b may be used by the processor 102 to perform disparity operations and/or calculations. The disparity operations may be used to generate disparity maps and/or stereo vision images. In one example, the disparity operations may be used by the processor 102 to determine a distance of an object away from the stereo camera 100.

In the example shown, the lenses 106a-106b may be in a vertical orientation with respect to each other (e.g., the lens 106a and the 106b may be 'stacked' vertically). For example, the video frames generated in response to pixel data captured by the top capture device 104a may be a top image and the video frames generated in response to pixel data captured by the bottom capture device 104b may be a bottom image of a stereo pair of images (e.g., a target video frame and a reference video frame). Disparity maps generated by the processor 102 with the lenses 106a-106b in the vertical orientation may be vertical disparity maps (e.g., vertical disparity space images).

Figure 2:
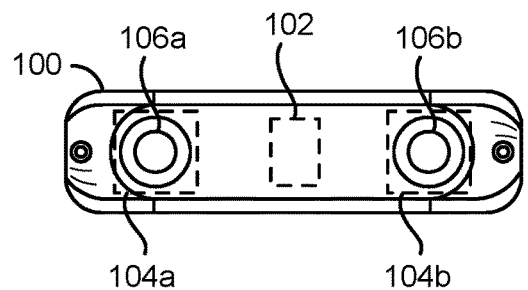
FIG. 2 is a diagram illustrating a stereo camera in a horizontal orientation.

Referring to FIG. 2, a diagram illustrating a stereo camera in a horizontal orientation is shown. An alternate embodiment of the stereo camera 100 is shown. The stereo camera 100 may comprise the processor 102, the capture devices 104a-104b and the lenses 106a-106b. The stereo camera 100 is shown in a horizontal orientation.

In the example shown, the lenses 106a-106b may be in a horizontal orientation with respect to each other (e.g., the lens 106a may be a right lens and the 106b may be left lens). For example, the video frames generated in response to pixel data captured by the right capture device 104a may be a right image and the video frames generated in response to pixel data captured by the left capture device 104b may be a left image of a stereo pair of images (e.g., a target video frame and a reference video frame). Disparity maps generated by the processor 102 with the lenses 106a-106b in the horizontal orientation may be horizontal disparity maps (e.g., horizontal disparity space images).

The orientation of the stereo camera 100 may be selected based on the particular use case. The vertical orientation of the stereo camera 100 shown in association with FIG. 1 may have advantages over the horizontal orientation of the stereo camera 100 shown in association with FIG. 2 when implemented on a vehicle. Other orientations of the stereo camera 100 may be implemented (e.g., diagonal orientation). In the example shown, the stereo camera 100 may comprise one stereo pair of cameras. In some embodiments, the stereo camera 100 may comprise multiple stereo pairs of cameras (e.g., a camera system configured to capture stereo pairs of images in multiple fields of view at the same time). The orientation of the lenses 106a-106b may be varied according to the design criteria of a particular implementation.

Figure 3:
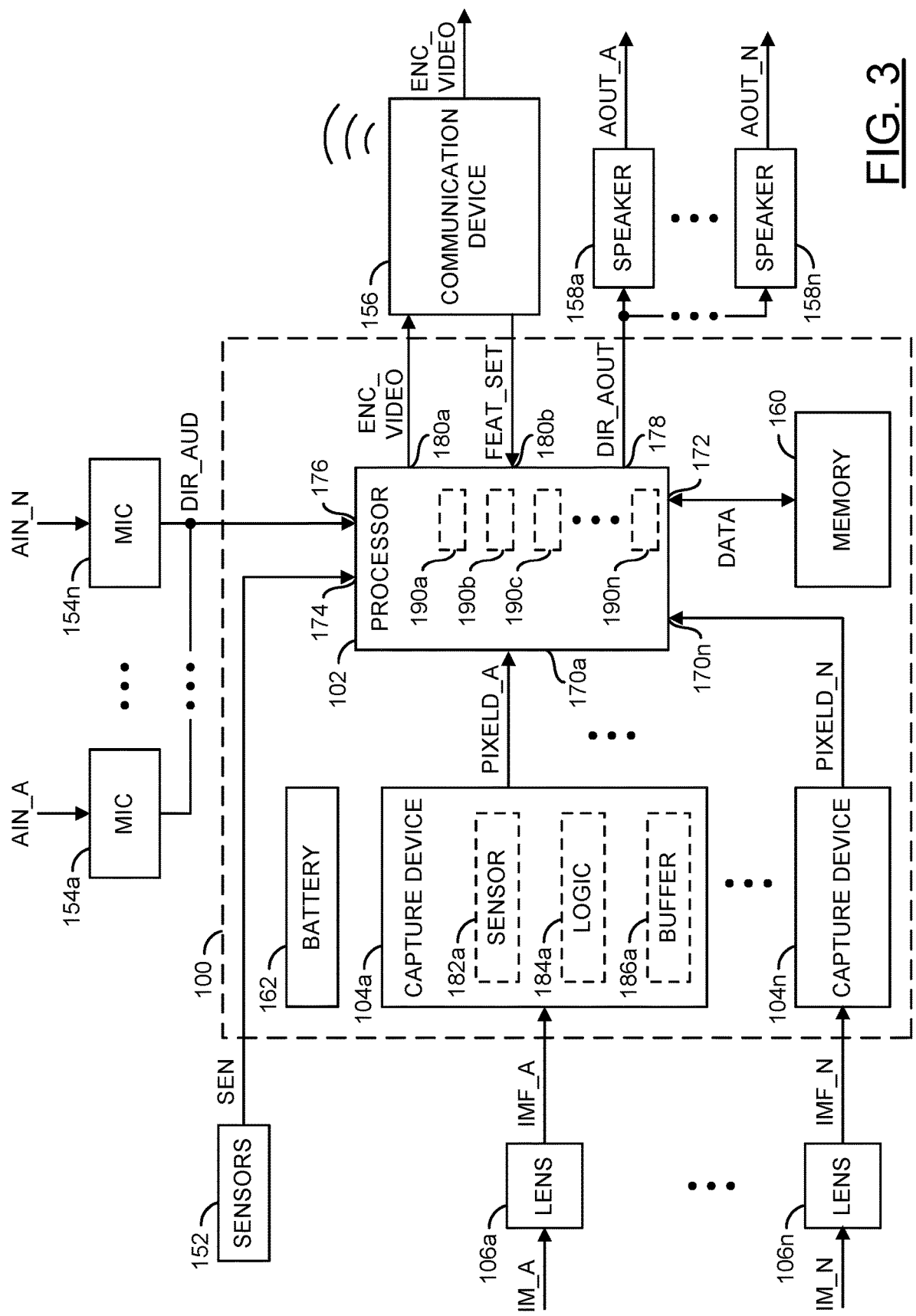
FIG. 3 is a block diagram illustrating an example embodiment of the present invention.

Referring to FIG. 3, a block diagram illustrating an example embodiment of the present invention is shown. A block diagram of the camera system 100 is shown. The camera system 100 may be a representative example of the camera system 100 shown in association with FIGS. 1-2. The camera system 100 generally comprises the processor 102, the capture devices 104a-104n, the lenses 106a-106n, a block (or circuit) 152, blocks (or circuits) 154a-154n, a block (or circuit) 156, blocks (or circuits) 158a-158n, a block (or circuit) 160 and/or a block (or circuit) 162. The circuit 152 may implement sensors. The circuits 154a-154n may implement microphones (e.g., audio capture devices). The circuit 156 may implement a communication device. The circuits 158a-158n may implement audio output devices (e.g., speakers). The circuit 160 may implement a memory. The circuit 162 may implement a power supply (e.g., a battery). The camera system 100 may comprise other components (not shown). In the example shown, some of the components 106-158 are shown external to the camera system 100. However, the components 106-158 may be implemented within and/or attached to the camera system 100 (e.g., the speakers 158a-158n may provide better functionality if not located inside a housing of the camera system 100). The number, type and/or arrangement of the components of the camera system 100 may be varied according to the design criteria of a particular implementation.

In an example implementation, the processor 102 may be implemented as a video processor. The processor 102 may comprise inputs 170a-170n and/or other inputs. The processor 102 may comprise an input/output 172. The processor 102 may comprise an input 174 and an input 176. The processor 102 may comprise an output 178. The processor 102 may comprise an output 180a and an input 180b. The number of inputs, outputs and/or bi-directional ports implemented by the processor 102 may be varied according to the design criteria of a particular implementation.

In the embodiment shown, the capture devices 104a-104n may be components of the camera system 100. In some embodiments, the capture devices 104a-104n may be separate devices (e.g., remotely connected to the camera system 100, such as a drone, a robot and/or a system of security cameras configured capture video data) configured to send data to the camera system 100. In one example, the capture devices 104a-104n may be implemented as part of an autonomous robot configured to patrol particular paths such as hallways. Similarly, in the example shown, the sensors 152, the microphones 154a-154n, the wireless communication device 156, and/or the speakers 158a-158n are shown external to the camera system 100 but in some embodiments may be a component of (e.g., within) the camera system 100.

The camera system 100 may receive one or more signals (e.g., IMF_A-IMF_N), a signal (e.g., SEN), a signal (e.g., FEAT_SET) and/or one or more signals (e.g., DIR_AUD). The camera system 100 may present a signal (e.g., ENC_VIDEO) and/or a signal (e.g., DIR_AOUT). The capture devices 104a-104n may receive the signals IMF_A-IMF_N from the corresponding lenses 106a-106n. The processor 102 may receive the signal SEN from the sensors 152. The processor 102 may receive the signal DIR_AUD from the microphones 154a-154n. The processor 102 may present the signal ENC_VIDEO to the communication device 156 and receive the signal FEAT_SET from the communication device 156. For example, the wireless communication device 156 may be a radio-frequency (RF) transmitter. In another example, the communication device 156 may be a Wi-Fi module. In another example, the communication device 156 may be a device capable of implementing RF transmission, Wi-Fi, Bluetooth and/or other wireless communication protocols. In some embodiments, the signal ENC_VIDEO may be presented to a display device connected to the camera 100. The processor 102 may present the signal DIR_AOUT to the speakers 158a-158n.

The lenses 106a-106n may capture signals (e.g., IM_A-IM_N). The signals IM_A-IM_N may be an image (e.g., an analog image) of the environment near the camera system 100 presented by the lenses 106a-106n to the capture devices 104a-104n as the signals IMF_A-IMF_N. The lenses 106a-106n may be implemented as an optical lens. The lenses 106a-106n may provide a zooming feature and/or a focusing feature. The capture devices 104a-104n and/or the lenses 106a-106n may be implemented, in one example, as a single lens assembly. In another example, the lenses 106a-106n may be a separate implementation from the capture devices 104a-104n. The capture devices 104a-104n are shown within the circuit 100. In an example implementation, the capture devices 104a-104n may be implemented outside of the circuit 100 (e.g., along with the lenses 106a-106n as part of a lens/capture device assembly).

In some embodiments, two or more of the lenses 106a-106n may be configured as a stereo pair of lenses. For example, the camera 100 may implement stereo vision. The lenses 106a-106n implemented as a stereo pair may be implemented at a pre-determined distance apart from each other and at a pre-determined inward angle. The pre-determined distance and/or the pre-determined inward angle may be used by the processor 102 to build disparity maps for stereo vision.

For a stereo camera implementation of the camera system 100, two capture devices (e.g., the capture devices 104a-104b) with two corresponding lenses (e.g., the lenses 106a-106b) may be implemented as a stereo pair. In some embodiments, the camera system 100 may comprise one stereo pair of lenses (e.g., the lens 106a and the lens 106b implemented as a stereo pair) and other lenses (e.g., the lenses 106c-106n) that operate independent from each other. In some embodiments, each of the lenses 106a-106n may be paired with one other of the lenses 106a-106n to implement multiple stereo pairs of cameras (e.g., to generate a panoramic video comprising multiple stereo vision images). The number of capture devices 104a-104n and/or the number of lenses 106a-106n may be varied according to the design criteria of a particular implementation.

The capture devices 104a-104n may be configured to capture image data for video (e.g., the signals IMF_A-IMF_N from the lenses 106a-106n). In some embodiments, the capture devices 104a-104n may be video capturing devices such as cameras. The capture devices 104a-104n may capture data received through the lenses 106a-106n to generate raw pixel data. In some embodiments, the capture devices 104a-104n may capture data received through the lenses 106a-106n to generate bitstreams (e.g., generate video frames). For example, the capture devices 104a-104n may receive focused light from the lenses 106a-106n. The lenses 106a-106n may be directed, tilted, panned, zoomed and/or rotated to provide a targeted view from the camera system 100 (e.g., a view for a video frame, a view for a panoramic video frame captured using multiple capture devices 104a-104n, a target image and reference image view for stereo vision, etc.). The capture devices 104a-104n may generate signals (e.g., PIXELD_A-PIXELD_N). The signals PIXELD_A-PIXELD_N may be pixel data (e.g., a sequence of pixels that may be used to generate video frames). In some embodiments, the signals PIXELD_A-PIXELD_N may be video data (e.g., a sequence of video frames). The signals PIXELD_A-PIXELD_N may be presented to the inputs 170a-170n of the processor 102.

The capture devices 104a-104n may transform the received focused light signals IMF_A-IMF_N into digital data (e.g., bitstreams). In some embodiments, the capture devices 104a-104n may perform an analog to digital conversion. For example, the capture devices 104a-104n may perform a photoelectric conversion of the focused light received by the lenses 106a-106n. The capture devices 104a-104n may transform the bitstreams into pixel data, images and/or video frames. In some embodiments, the pixel data generated by the capture devices 104a-104n may be uncompressed and/or raw data generated in response to the focused light from the lenses 106a-106n. In some embodiments, the output of the capture devices 104a-104n may be digital video signals.

The sensors 152 may comprise one or more input devices. The sensors 152 may be configured to detect physical input from the environment and convert the physical input into computer readable signals. The signal SEN may comprise the computer readable signals generated by the sensors 152. In an example, one of the sensors 152 may be configured to detect an amount of light and present a computer readable signal representing the amount of light detected. In another example, one of the sensors 152 may be configured to detect motion and present a computer readable signal representing the amount of motion detected. The sensors 152 may be configured to detect temperature (e.g., a thermometer), orientation (e.g., a gyroscope), a movement speed (e.g., an accelerometer), etc. The types of input detected by the sensors 152 may be varied according to the design criteria of a particular implementation.

The data provided in the signal SEN provided by the sensors 152 may be read and/or interpreted by the processor 102. The processor 102 may use the data provided by the signal SEN for various operations. In some embodiments, the processor 102 may use a light reading from the sensors 152 to determine whether to activate an infrared light (e.g., to provide night vision). In another example, the processor 102 may use information about movement from an accelerometer and/or a gyroscope to perform motion correction on video frames generated. The types of operations performed by the processor 102 in response to the signal SEN may be varied according to the design criteria of a particular implementation.

The communication device 156 may send and/or receive data to/from the camera system 100. In some embodiments, the communication device 156 may be implemented as a wireless communications module. In some embodiments, the communication device 156 may be implemented as a satellite connection to a proprietary system. In one example, the communication device 156 may be a hard-wired data port (e.g., a USB port, a mini-USB port, a USB-C connector, HDMI port, an Ethernet port, a DisplayPort interface, a Lightning port, etc.). In another example, the communication device 156 may be a wireless data interface (e.g., Wi-Fi, Bluetooth, ZigBee, cellular, etc.).

The communication device 156 may be configured to receive the signal FEAT_SET. The signal FEAT_SET may comprise a feature set. The feature set received may be used to detect events and/or objects. For example, the feature set may be used to perform the computer vision operations. The feature set information may comprise instructions for the processor 102 for determining which types of objects correspond to an object and/or event of interest.

The processor 102 may receive the signals PIXELD_A-PIXELD_N from the capture devices 104a-104n at the inputs 170a-170n. The processor 102 may send/receive a signal (e.g., DATA) to/from the memory 160 at the input/output 172. The processor 102 may receive the signal SEN from the sensors 152 at the input port 174. The processor 102 may receive the signal DIR_AUD from the microphones 154a-154n at the port 176. The processor 102 may send the signal DIR_AOUT to the speakers 158a-158n via the port 178. The processor 102 may send the signal ENC_VIDEO to the communication device 156 via the output port 180a. The processor 102 may receive the signal FEAT_SET from the communication device 156 via the input port 180b. In an example, the processor 102 may be connected through a bi-directional interface (or connection) to the capture devices 104a-104n, the sensors 152, the microphones 154a-154n, the communication device 156, and/or the speakers 158a-158n and/or the memory 160. The processor 102 may store and/or retrieve data from the memory 160. The memory 160 may be configured to store computer readable/executable instructions (or firmware). The instructions, when executed by the processor 102, may perform a number of steps.

The signal PIXELD_A-PIXELD_N may comprise raw pixel data providing a field of view captured by the lenses 106a-106n. The processor 102 may be configured to generate video frames from the pixel data PIXELD_A-PIXELD_N. The video frames generated by the processor 102 may be used internal to the processor 102 (e.g., to perform video encoding, video transcoding, perform computer vision operations, etc.). In some embodiments, the video frames may be communicated to the memory 160 for temporary storage. The processor 102 may be configured to generate encoded video frames and communicate the encoded video frames to the communication device 156 as the signal ENC_VIDEO.

The processor 102 may be configured to make decisions based on analysis of the video frames generated from the signals PIXELD_A-PIXELD_N. The processor 102 may generate the signal ENC_VIDEO, the signal DATA, the signal DIR_AOUT and/or other signals (not shown). The signal ENC_VIDEO, the signal DATA and/or the signal DIR_AOUT may each be generated (in part) based on one or more decisions made and/or functions performed by the processor 102. The decisions made and/or functions performed by the processor 102 may be determined based on data received by the processor 102 at the inputs 170a-170n (e.g., the signals PIXELD_A-PIXELD_N), the input 172, the input 174, the input 176, the input 180b and/or other inputs.

The inputs 170a-170n, the input/output 172, the input 174, the input 176, the output 178, the output 180a, the input 180b, and/or other inputs/outputs may implement an interface. The interface may be implemented to transfer data to/from the processor 102, the sensors 152, the communication device 156, the capture devices 104a-104n, the memory 160, the microphones 154a-154n, the speakers 158a-158n and/or other components of the camera system 100. In one example, the interface may be configured to receive (e.g., via the inputs 170a-170n) the pixel data signals PIXELD_A-PIXELD_N each from a respective one of the capture devices 104a-104n. In another example, the interface may be configured to receive (e.g., via the input 174) sensor input from the sensors 152. In yet another example, the interface may be configured to receive (e.g., via the input 176) the directional audio DIR_AUD. In still another example, the interface may be configured to transmit encoded video frames (e.g., the signal ENC_VIDEO) and/or the converted data determined based on the computer vision operations to the communication device 156. In another example, the interface may be configured to receive the feature set information FEAT_SET (e.g., via the input port 180b) from the communication device 156. In yet another example, the interface may be configured to transmit directional audio output (e.g., the signal DIR_AOUT) to each of the speakers 158a-158n. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal ENC_VIDEO may be presented to the communication device 156. In some embodiments, the signal ENC_VIDEO may comprise encoded video frames generated by the processor 102. In some embodiments, the encoded video frames may comprise a full video stream (e.g., encoded video frames representing all video captured by the capture devices 104a-104n). In some embodiments, the encoded video frames may comprise a timelapse video. The encoded video frames may be encoded, cropped, stitched and/or enhanced versions of the pixel data received from the signals PIXELD_A-PIXELD_N. In an example, the encoded video frames may be a high resolution, digital, encoded, de-warped, stabilized, cropped, blended, stitched and/or rolling shutter effect corrected version of the signals PIXELD_A-PIXELD_N. In some embodiments, the signal ENC_VIDEO may comprise one or more disparity maps and/or stereo vision images.

In some embodiments, the signal ENC_VIDEO may be generated based on video analytics (e.g., computer vision operations) and/or disparity operations performed by the processor 102 on the video frames generated from the pixel data PIXELD_A-PIXELD_N. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events to determine video frames to select for the smart time lapse video. The processor 102 may be configured to locally (e.g., without communicating to an external device to offload computing operations) perform the disparity operations to determine a distance of the camera system 100 from one or more objects detected.

In some embodiments, the signal ENC_VIDEO may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, etc.). In some embodiments, the signal ENC_VIDEO may be provided to a cloud service for mass storage (e.g., to enable a user to retrieve the encoded video using a smartphone and/or a desktop computer). The type of information communicated by the signal ENC_VIDEO may be varied according to the design criteria of a particular implementation.

The circuit 100 may implement a camera system. In some embodiments, the camera system 100 may be implemented as a drop-in solution (e.g., installed as one component). In an example, the camera system 100 may be a device that may be installed as an after-market product (e.g., a retro-fit for a drone, a retro-fit for a security system, etc.). In some embodiments, the camera system 100 may be a component of a security system. The number and/or types of signals and/or components implemented by the camera system 100 may be varied according to the design criteria of a particular implementation.

The video data of the targeted view captured by the capture devices 104a-104n may be generated from the signals/bitstreams/data PIXELD_A-PIXELD_N. The capture devices 104a-104n may present the signals PIXELD_A-PIXELD_N to the inputs 170a-170n of the processor 102. The signals PIXELD_A-PIXELD_N may be used by the processor 102 to generate the video frames/video data. In some embodiments, the signals PIXELD_A-PIXELD_N may be video streams captured by the capture devices 104a-104n. In some embodiments, the capture devices 104a-104n may be implemented in the camera system 100. In some embodiments, the capture devices 104a-104n may be configured to add to existing functionality to the camera system 100.

Each of the capture devices 104a-104n may comprise a block (or circuit) 182, a block (or circuit) 184, and/or a block (or circuit) 186. The circuit 182 may implement a camera sensor (e.g., a complementary metal-oxide-semiconductor (CMOS) sensor). The circuit 184 may implement a camera processor/logic. The circuit 186 may implement a memory buffer. As a representative example, the capture device 104a is shown comprising the sensor 182a, the logic block 184a and the buffer 186a. Similarly, the capture devices 104b-104n may comprise the camera sensors 182b-182n, the logic blocks 184b-184n and the buffers 186b-186n. The sensors 182a-182n may each be configured to receive light from the corresponding one of the lenses 106a-106n and transform the light into digital data (e.g., the bitstreams).

In one example, the sensor 182a of the capture device 104a may receive light from the lens 106a. The camera sensor 182a of the capture device 104a may perform a photoelectric conversion of the light from the lens 106a. In some embodiments, the sensor 182a may be an oversampled binary image sensor. In some embodiments, the camera sensor 182a may comprise an RGB sensor or an RGB-IR sensor. In some embodiments, the camera sensor 182a may comprise a rolling shutter sensor or a global shutter sensor. The logic 184a may transform the bitstream into a human-legible content (e.g., pixel data and/or video data). For example, the logic 184a may receive pure (e.g., raw) data from the camera sensor 182a and generate pixel data based on the raw data (e.g., the bitstream). The memory buffer 186a may store the raw data and/or the processed bitstream. For example, the frame memory and/or buffer 186a may store (e.g., provide temporary storage and/or cache) the pixel data and/or one or more of the video frames (e.g., the video signal).

The microphones 154a-154n may be configured to capture incoming audio and/or provide directional information about the incoming audio. Each of the microphones 154a-154n may receive a respective signal (e.g., AIN_A-AIN_N).

The signals AIN_A-AIN_N may be audio signals from the environment near the camera system 100. For example, the signals AIN_A-AIN_N may be ambient noise in the environment. The microphones 154a-154n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 154a-154n may provide the signal DIR_AUD to the interface 176. The camera system 100 may comprise the interface 176 configured to receive data (e.g., the signal DIR_AUD) from one or more of the microphones 154a-154n. In one example, data from the signal DIR_AUD presented to the interface 176 may be used by the processor 102 to determine the location of the source of the audio input. In another example, the microphones 154a-154n may be configured to determine the location of the audio input and present the location to the interface 176 as the signal DIR_AUD.

The number of microphones 154a-154n may be varied according to the design criteria of a particular implementation. The number of microphones 154a-154n may be selected to provide sufficient directional information about the incoming audio (e.g., the number of microphones 154a-154n implemented may be varied based on the accuracy and/or resolution of directional information acquired). In an example, 2 to 6 of the microphones 154a-154n may be implemented. In some embodiments, an audio processing component may be implemented with the microphones 154a-154n to process and/or encode the incoming audio signals AIN_A-AIN_N. In some embodiments, the processor 102 may be configured with on-chip audio processing to encode the incoming audio signals AIN_A-AIN_N. The microphones 154a-154n may capture audio of the environment 50. The camera system 100 may be configured to synchronize the audio captured with the images captured by the capture devices 104a-104n.

The processor 102 may be configured to execute computer readable code and/or process information. The processor 102 may be configured to receive input and/or present output to the memory 160. The processor 102 may be configured to present and/or receive other signals (not shown). The number and/or types of inputs and/or outputs of the processor 102 may be varied according to the design criteria of a particular implementation.

The processor 102 may receive the signals PIXELD_A-PIXELD_N, the signal SEN, the signal DIR_AUD, the signal FEAT_SET and/or the signal DATA. The processor 102 may make a decision based on data received at the inputs 170a-170n, the input 172, the input 174, the input 176, the input 180b and/or other input. For example, other inputs may comprise external signals generated in response to user input, external signals generated by the sensors 152, the microphones 154a-154n and/or internally generated signals such as signals generated by the processor 102 in response to analysis of the video frames and/or objects detected in the video frames. The processor 102 may adjust the video data (e.g., crop, digitally move, physically move the camera sensors 182a-182n, etc.) of the video frames. The processor 102 may generate the signal ENC_VIDEO and/or the signal DIR_AOUT in response to data received by the inputs 170a-170n, the input 172, the input 174, the input 176, the input 180b and/or the decisions made in response to the data received by the inputs 170a-170n, the input 172, the input 174, the input 176 and/or the input 180b. The various operations performed by the processor 102 may be performed locally (e.g., using internal components of the camera system 100 rather than offloading computing operations to external resources such as a cloud service).

The signal ENC_VIDEO and/or the signal DIR_AOUT may be generated to provide an output in response to the captured video frames, the video encoding and/or the video analytics performed by the processor 102. For example, the video analytics may be performed by the processor 102 in real-time and/or near real-time (e.g., with minimal delay).

The cropping, downscaling, blending, stabilization, packetization, encoding, compression and/or conversion performed by the processor 102 may be varied according to the design criteria of a particular implementation. For example, the video frames generated by the processor 102 may be a processed version of the signals PIXELD_A-PIXELD_N configured to enable detection of the objects and/or determination of the characteristics of the detected objects. In some embodiments, the video data may be encoded at a high bitrate. For example, the signal may be generated using a lossless compression and/or with a low amount of lossiness.

In some embodiments, the video frames may be some view (or derivative of some view) captured by the capture devices 104a-104n. For example, the video frames may comprise a portion of the panoramic video captured by the capture devices 104a-104n. In another example, the video frames may comprise a region of interest selected and/or cropped from the panoramic video frame by the processor 102 (e.g., upscaled, oversampled and/or digitally zoomed) to enable a high precision of object detection. In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The memory 160 may store data. The memory 160 may be implemented as a cache, flash memory, DRAM memory, etc. The type and/or size of the memory 160 may be varied according to the design criteria of a particular implementation. The data stored in the memory 160 may correspond to a video file, user profiles, user permissions, a feature set, types of objects/events of interest, information about the configuration of the lenses 106a-106n, etc.

The battery 162 may be configured to provide power to the components of the camera 100. The battery 162 may enable the camera 100 to operate without continual access to an external power supply. In an example, the battery 162 may comprise a lithium-ion type of battery. In another example, the battery 162 may comprise a supercapacitor. The type of battery 162 implemented may be varied according to the design criteria of a particular implementation.

In some embodiments, the lenses 106a-106n (e.g., camera lenses) may be directed to provide a panoramic view from the camera system 100. The lenses 106a-106n may be aimed to capture environmental data (e.g., light). The lenses 106a-106n may be configured to capture and/or focus the light for the capture devices 104a-104n. Generally, the camera sensors 182a-182n may be located behind each of the respective lenses 106a-106n. Based on the captured light from the lenses 106a-106n, the capture devices 104a-104n may generate a bitstream and/or raw pixel data.

Embodiments of the processor 102 may perform video stitching operations on the signals PIXELD_A-PIXELD_N.

In one example, each of the pixel data signals PIXELD_A-PIXELD_N may provide a portion of a panoramic view and the processor 102 may crop, blend, synchronize and/or align the pixel data from the signals PIXELD_A-PIXELD_N to generate the panoramic video frames. In some embodiments, the processor 102 may be configured to perform electronic image stabilization (EIS). The processor 102 may perform de-warping on the video frames. The processor 102 may perform intelligent video analytics on the de-warped video frames. The processor 102 discard the video frames after the video analytics and/or computer vision has been performed.

The encoded video frames may be processed locally. In one example, the encoded, panoramic video may be stored locally by the memory 160 to enable the processor 102 to facilitate the computer vision analysis internally (e.g., without first uploading video frames to a cloud service). The processor 102 may be configured to perform operations such as computer vision operations and/or disparity operations locally (e.g., all operations performed internal to the housing of the camera system 100 without using external resources such as a cloud service for processing).

The processor 102 may receive an input to generate the video frames (e.g., the signals PIXELD_A-PIXELD_N) from the CMOS sensor(s) 182a-182n. The pixel data signals PIXELD_A-PIXELD_N may be enhanced by the processor 102 (e.g., color conversion, noise filtering, auto exposure, auto white balance, auto focus, etc.). Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view captured by the camera system 100 may be used to generate panoramic video such as a spherical video, a hemispherical video, a 360 degree video, a wide angle video, a video having less than a 360 field of view, etc.

Panoramic videos may comprise a view of the environment near the camera system 100. In one example, the entire field of view of the panoramic video may be captured at generally the same time (e.g., each portion of the panoramic video represents the view from the camera system 100 at one particular moment in time). In some embodiments (e.g., when the camera system 100 implements a rolling shutter sensor), a small amount of time difference may be present between some portions of the panoramic video. Generally, each video frame of the panoramic video comprises one exposure of the sensor (or the multiple sensors 182a-182n) capturing the environment near the camera system 100.

In some embodiments, the field of view may provide coverage for a full 360 degree field of view. In some embodiments, less than a 360 degree view may be captured by the camera system 100 (e.g., a 270 degree field of view, a 180 degree field of view, etc.). In some embodiments, the panoramic video may comprise a spherical field of view (e.g., capture video above and below the camera system 100). For example, the camera system 100 may be mounted on a ceiling and capture a spherical field of view of the area below the camera system 100. In some embodiments, the panoramic video may comprise a field of view that is less than a spherical field of view (e.g., the camera system 100 may be configured to capture the ground below and the areas to the sides of the camera system 100 but nothing directly above). The implementation of the camera system 100 and/or the captured field of view may be varied according to the design criteria of a particular implementation.

In embodiments implementing multiple lenses, each of the lenses 106a-106n may be directed towards one particular direction to provide coverage for a full 360 degree field of view. In embodiments implementing a single wide angle lens (e.g., the lens 106a), the lens 106a may be located to provide coverage for the full 360 degree field of view (e.g., on the bottom of the camera system 100 in a ceiling mounted embodiment, on the bottom of a drone camera, etc.). In some embodiments, less than a 360 degree view may be captured by the lenses 106a-106n (e.g., a 270 degree field of view, a 180 degree field of view, etc.). In some embodiments, the lenses 106a-106n may move (e.g., the direction of the capture devices may be controllable). In some embodiments, one or more of the lenses 106a-106n may be configured to implement an optical zoom (e.g., the lenses 106a-106n may zoom in/out independent of each other).

In some embodiments, the camera system 100 may be implemented as a system on chip (SoC). For example, the camera system 100 may be implemented as a printed circuit board comprising one or more components (e.g., the capture devices 104a-104n, the processor 102, the communication device 156, the memory 160, etc.). The camera system 100 may be configured to perform intelligent video analysis on the video frames of the video. The camera system 100 may be configured to crop and/or enhance the video.

In some embodiments, the processor 102 may be configured to perform sensor fusion operations. The sensor fusion operations performed by the processor 102 may be configured to analyze information from multiple sources (e.g., the capture devices 104a-104n, the sensor 152 and the microphones 154a-154n). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from the directional audio DIR_AUD. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

The signal DIR_AOUT may be an audio output. For example, the processor 102 may generate output audio based on information extracted from the video frames PIXELD_A-

PIXELD_N. The signal DIR_AOUT may be determined based on an event and/or objects determined using the computer vision operations. In one example, the signal DIR_AOUT may comprise an audio message for people detected. In some embodiments, the signal DIR_AOUT may not be generated until an event has been detected by the processor 102 using the computer vision operations.

The signal DIR_AOUT may comprise directional and/or positional audio output information for the speakers 158a-158n. The speakers 158a-158n may receive the signal DIR_AOUT, process the directional and/or positional information and determine which speakers and/or which channels will play back particular audio portions of the signal DIR_AOUT. The speakers 158a-158n may generate the signals AOUT_A-AOUT_N in response to the signal DIR_AOUT. The signals AOUT_A-AOUT_N may be the audio message played. For example, the speakers 158a-158n may emit a pre-recorded message in response to a detected event. The signal DIR_AOUT may be a signal generated in a format that provides directional information for the signals AOUT_A-AOUT_N.

The number of speakers 158a-158n may be varied according to the design criteria of a particular implementation. The number of speakers 158a-158n may be selected to provide sufficient directional channels for the outgoing audio (e.g., the number of speakers 158a-158n implemented may be varied based on the accuracy and/or resolution of directional audio output). In an example, 1 to 6 of the speakers 158a-158n may be implemented. In some embodiments, an audio processing component may be implemented by the speakers 158a-158n to process and/or decode the output audio signals DIR_AOUT. In some embodiments, the processor 102 may be configured with on-chip audio processing. In some embodiments, the signal DIR_AOUT may playback audio received from remote devices (e.g., smartphones) in order to implement a 2-way real-time audio communication.

The video pipeline of the processor 102 may be configured to locally perform de-warping, cropping, enhancements, rolling shutter corrections, stabilizing, downscaling, packetizing, compression, conversion, blending, synchronizing and/or other video operations. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the processor 102 may be varied according to the design criteria of a particular implementation.

The sensors 182a-182n may each implement a high-resolution sensor. Using the high resolution sensors 182a-182n, the processor 102 may combine over-sampling of the image sensors 182a-182n with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, one or more of the lenses 106a-106n may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., the directional microphones 154a-154n may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensors 182a-182n. The over-sampling of the image sensors 182a-182n may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture devices 104a-104n). In an example, the dewarping may alter the video data to generate a rectilinear video frame (e.g., correct artifacts caused by the lens characteristics of the lenses 106a-106n). The dewarping operations may be implemented to correct the distortion caused by the lenses 106a-106n. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data PIXELD_A-PIXELD_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n and/or other components of the camera system 100 may be described in association with U.S. patent application Ser. No. 15/931,942, filed on May 14, 2020, U.S. patent application Ser. No. 16/831,549, filed on Mar. 26, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, etc.) to be performed locally on the camera 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received in the signal FEAT_SET. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of the objects and/or events through multiple layers of feature detection. The CNN module 190b may be configured to calculate descriptors based on the feature detection performed. The descriptors may enable the processor 102 to determine a likelihood that pixels of the video frames correspond to particular objects (e.g., the people, pets, items, text, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 190*b* as a dedicated hardware module of the processor 102 may enable the camera system 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object to match against (e.g., reference objects) may be customized using an open operand stack (enabling programmability of the processor 102 to implement various directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 106*a*-106*n* may represent one coordinate (e.g., a location coordinate on a third axis) for a depth location of the body part in 3D space. Using the location of various body parts in 3D space, the processor 102 may determine body position, and/or body characteristics of the people 70*a*-70*n*.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

The hardware module 190*c* may be configured to implement a disparity engine. The disparity engine 190*c* may be configured to perform the disparity operations. The disparity engine 190*c* may be configured to determine a distance based on images captured as a stereo pair. Two or more of the capture devices 104*a*-104*n* may be configured as a stereo pair of cameras (e.g., a stereo camera). The capture devices 104*a*-104*n* configured as a stereo pair may be implemented close to each other at a pre-defined distance and/or have a symmetrical orientation about a central location. The capture devices 104*a*-104*n* configured as a stereo pair may be configured to capture video frames from similar, but slightly different perspectives (e.g., angled inwards to capture fields of view that overlap).

The disparity engine 190*c* may be configured to perform a comparison to analyze the differences between the stereo pair of images. In an example, the processor 102 may detect feature points of the same object detected in both video frames captured by the capture devices 104a-104n configured as a stereo pair (e.g., the reference image and the target image). The disparity engine 190c may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the predefined distance between the capture devices 104a-104n configured as a stereo pair, the disparity engine 190c may be configured to determine a distance. The distance determined by the disparity engine 190c may be the distance from the capture devices 104a-104n configured as a stereo pair. In an example, the disparity engine 190c may determine a distance from the capture devices 104a-104n configured as a stereo pair to a particular object (e.g., a vehicle, a bicycle, a pedestrian, driver, a vehicle occupant, etc.) based on the comparison of the differences in the stereo pair of images captured.

The predetermined distance and the predetermined angle of the lenses 106a-106b may be used by the disparity engine 190c to generate disparity values, disparity maps and/or stereo vision images. In some embodiments, the disparity engine 190c may implement a cache memory for storing the calibration data about the lenses 106a-106b of stereo camera 100 and/or the other capture devices 104a-104n.

The disparity engine 190c may be configured to compare pixels of a reference image and a target image. The disparity engine 190c may determine matching scores between locations in the reference image and the target image. The matching scores may provide an indication of how similar the pixel data at one location in the target image is to another location in the reference image. The matching scores may be used to determine the offset between the target image and the reference image. The disparity engine 190c may be configured to determine the matching scores and/or offset values using block matching techniques/calculations, semi-global matching techniques/calculations, implement guide nodes, etc. The disparity engine 190c may be configured to determine peak offset locations for individual pixels in the target image and the reference image. The peak offset locations may be determined at a sub-pixel level.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
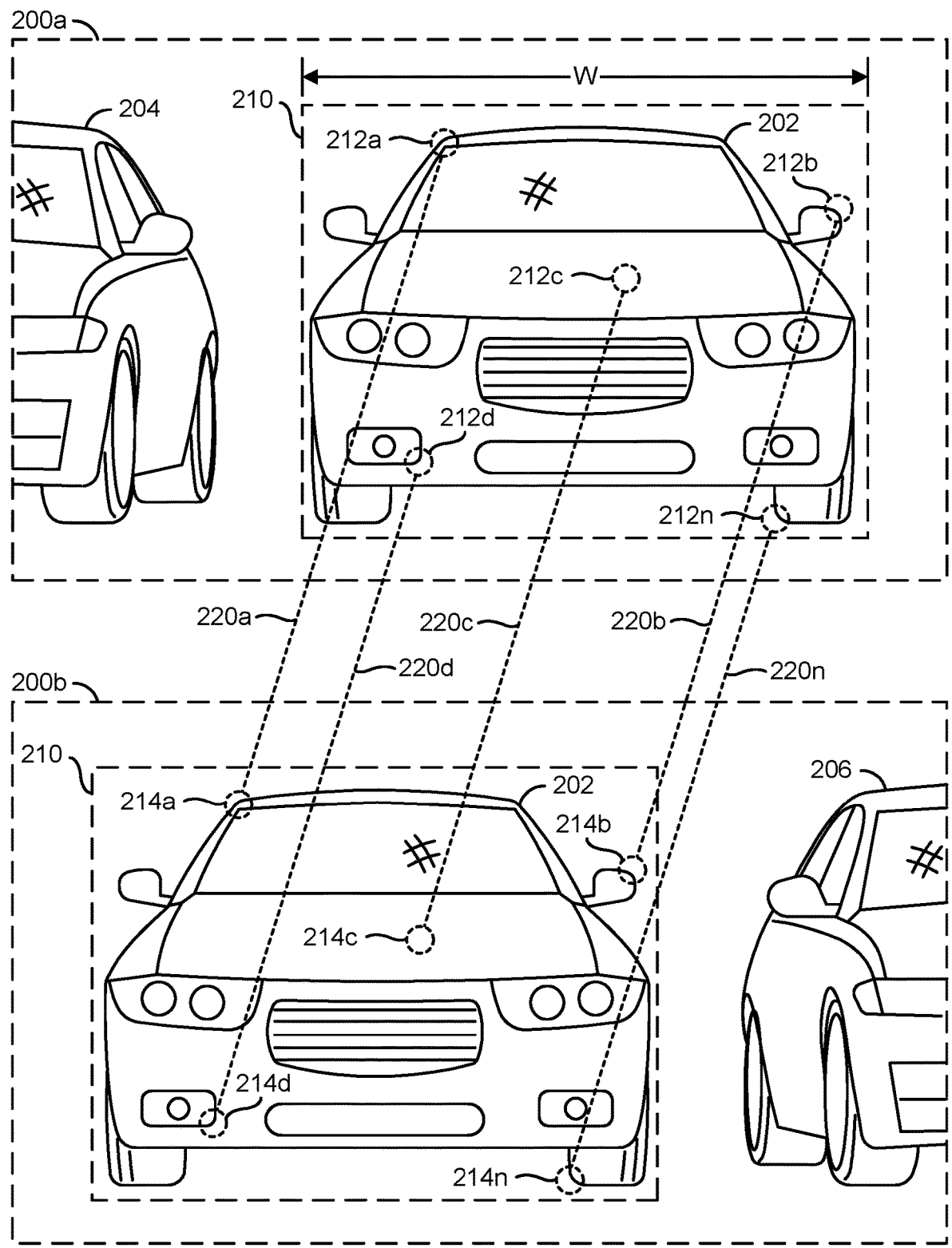
FIG. 4 is a diagram illustrating a disparity between a reference image and a target image.

Referring to FIG. 4, a diagram illustrating a disparity between a reference image and a target image is shown. Example video frames 200a-200b are shown. The video frames 200a-200b may comprise a stereo pair of images captured by the stereo camera 100. In an example, the video frame 200a may be video frame generated from the pixel data captured by the right capture device 104a (e.g., the pixel data PIXELD_A) and the video frame 200b may be a video frame generated from the pixel data captured by the left capture device 104b (e.g., the pixel data PIXELD_B). In the example shown, the stereo pair of images 200a-200b may correspond to a horizontal orientation of the lenses 106a-106b. However, the description of the stereo pair of images 200a-200b may be applicable to any orientation of the stereo pair of lenses 106a-106b. In one example, the image 200a may be a reference image and the image 200b may be the target image. In another example, the image 200b may be the reference image and the image 200a may be the target image. Which of the stereo pair of images is used by the disparity engine 190c as the target image and the reference image may be varied according to the design criteria of a particular implementation.

The example stereo pair of video frames 200a-200b may show a portion of the video data captured by the capture device 104a and/or the capture device 104b (e.g., the field of views captured by the capture device 104a may comprise more video data than shown in the video frame 200a and/or the field of view captured by the capture device 104b may comprise more video data than shown in the video frame 200b). The stereo pair of video frames 200a-200b may be representative examples of video frames captured by a virtual stereo pair of cameras implemented by the apparatus 100.

The stereo pair of video frames 200a-200b are shown as rectilinear video frames. The video processing pipeline of the processor 102 may comprise a dewarping engine configured to perform dewarping video operations to generate rectilinear video frames from one or more non-rectilinear video frames captured by the capture devices 104a-104n. In an example, the processor 102 may receive non-rectilinear video frames (e.g., captured by cameras with a 160 degree field of view lens) having a barrel/fisheye lens characteristic. In some embodiments, the processor 102 may be configured to perform the video operations and/or the comparison operations (e.g., detect objects, determine distance, determine relative velocity, etc.) on the non-rectilinear video frames presented to the processor 102. In some embodiments, the processor 102 may be configured to dewarp the non-rectilinear video frames using the dewarping engine and then perform the video operations on the rectilinear video frames.

The stereo pair of video frames 200a-200b may comprise video data captured from a similar, but slightly different, perspective. Generally, the stereo pair of video frames 200a-200b may capture the same area and/or objects. Capturing a similar view of an area and/or objects in the stereo pair of video frames 200a-200b may enable the disparity engine 190c to perform calculations (e.g., comparison operations) to determine a relative distance and/or velocity of detected objects.

The video frame 200a may comprise video data of a vehicle 202 and a portion of a vehicle 204. A dotted shape 210 is shown. The dotted shape 210 may represent the detection of an object by the computer vision operations performed by the processor 102. The dotted shape 210 may comprise the pixel data corresponding to an object detected by the computer vision operations pipeline and/or the CNN module 190b. The dotted shape 210 is shown for illustrative purposes. In an example, the dotted shape 210 may be a visual representation of the object detection (e.g., the dotted shape 210 may not appear on an output video frames). In another example, the dotted shape 210 may be a bounding box generated by the processor 102 displayed on the output video frames to indicate that an object has been detected (e.g., the bounding box 210 may be displayed in a debug mode of operation).

The computer vision operations may be configured to detect characteristics of the detected objects and/or behavior of the objects detected. The characteristics of the objects may comprise a height, length, width, slope, an arc length, a color, an amount of light emitted, detected text on the object, a path of movement, a speed of movement, a direction of movement, etc. The characteristics of the detected object may comprise a status of the object (e.g., opened, closed, on, off, etc.). The behavior may be determined in response to the type of object and/or the characteristics of the objects detected. While one example stereo pair of video frames 200a-200b are shown, the behavior of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

The vehicle 202 is shown detected as the object 210. A number of dotted circles 212a-212n are shown. The dotted circles 212a-212n may represent feature points of the object 210 detected by the processor 102 (e.g., the CNN module 190b and/or the disparity engine 190c). In an example, the feature point 212a may correspond to a top left corner of the vehicle 202, the feature point 212b may correspond to a driver side mirror of the vehicle 202, the feature point 212c may correspond to the hood of the vehicle 202, the feature point 212d may correspond to a bottom left of the vehicle 202 and the feature point 212n may correspond to the right front tire of the vehicle 202. The location, type and/or amount of feature points 212a-212n detected by the processor 102 may be varied according to the design criteria of a particular implementation.

The video frame 200b may comprise the vehicle 202 and a portion of the vehicle 206. The vehicle 202 is shown detected as the object 210 (e.g., the same object as in the video frame 200a). A number of dotted circles 214a-214n are shown. The dotted circles 214a-214n may represent feature points of the object 210 detected by the processor 102. In an example, the feature point 214a may correspond to a top left corner of the vehicle 202, the feature point 214b may correspond to a driver side mirror of the vehicle 202, the feature point 214c may correspond to the hood of the vehicle 202, the feature point 214d may correspond to a bottom left of the vehicle 202 and the feature point 214n may correspond to the right front tire of the vehicle 202. Generally, the feature points 214a-214n in the video frame 200b may correspond to the respective feature points 212a-212n detected in the video frame 200a but may be shifted due to the offset between the lenses 106a-106b (e.g., shifted horizontally for a horizontally oriented stereo camera).

The vehicle 202 is shown located in a slightly different position in each of the stereo pair of video frames 200a-200b. The vehicle 206 is partially shown in the video frame 200b but not shown in the video frame 200a. The vehicle 204 is partially shown in the video frame 200a but not shown in the video frame 200b. The different locations of the vehicles 202-206 in the stereo pair of video frames 200a-200b may represent that the stereo pair of video frames 200a-200b have been captured from a slightly different perspective. For example, the video frame 200a may be captured a distance away from video frame 200b corresponding to the offset between the lenses 106a-106b. The stereo pair of video frames 200a-200b may capture a different angle. For example, the capture device 104a and the capture device 104b may be angled inwards (e.g., instead of being aimed straight outwards from the stereo camera 100). Because the capture device 104a and the capture device 104b may be angled inwards, the field of view captured by both the lenses 106a-106b may capture an overlapping area. The amount of offset between the stereo pair of images 200a-200b may be exaggerated for illustrative purposes. The amount of offset between the stereo pair of images 200a-200b may correspond to the distance between the stereo pair of lenses 106a-106b and a distance of the objects (e.g., the vehicles 202-206) from the lenses 106a-106b (e.g., the inward angle of the stereo pair of lenses 106a-106b may result in objects closer to the stereo camera 100 appearing to have more offset).

The CNN module 190b may be configured to detect the object 210 in the stereo pair of video frames 200a-200b. The CNN module 190b may be configured to recognize the vehicle 202 as the same object in both of the stereo pair of video frames 200a-200b. The CNN module 190b may detect the feature points 212a-212n in the video frame 200a and cross-reference the feature points 214a-214n detected in the video frame 200b. The CNN module 190b may compare the feature points 212a-212n and the feature points 214a-214n to determine that the vehicle 202 detected as the object 210 in the video frame 200a is the same as the vehicle 202 detected as the object 210 in the video frame 200b. The CNN module 190b may generate a confidence level to indicate a likelihood that the object 210 is the same object in both of the stereo pair of video frames 200a-200b. If the confidence level is above a pre-determined threshold value, then the processor 102 may determine that the object 210 is in both of the stereo video frames 200a-200b and enable the disparity engine 190c to perform a comparison.

If the CNN module 190b determines that the object 210 is the same object in both of the stereo pair of video frames 200a-200b, the disparity engine 190c may determine the relative distance and/or relative velocity of the object 210 with respect to the stereo camera 100. The disparity engine 190c may be configured to determine the relative distance and/or velocity of the object 210 based on the different perspectives and symmetrical orientation of the stereo pair of capture devices 104a-104b. The disparity engine 190c may be configured to perform comparison operations by calculating the differences (e.g., disparity) between the object 210 in the video frame 200a and the object 210 captured in the video frame 200b. The disparity engine 190c may determine the difference by comparing various feature points of the object 210 detected by the CNN module 190b.

Dotted lines 220a-220n are shown. The dotted lines 220a-220n may be, respectively, connected between the feature points 212a-212n of the video frame 200a and the corresponding feature points 214a-214n of the video frame 200b. In the example shown, the dotted line 220a may connect the feature point 212a to the feature point 214a, the dotted line 220b may connect the feature point 212b to the feature point 214b, the dotted line 220c may connect the feature point 212c to the feature point 214c, the dotted line 220d may connect the feature point 212d to the feature point 214d and the dotted line 220n may connect the feature point 212n to the feature point 214n. The dotted lines 220a-220n may connect to the same feature of the object 210 in both of the stereo pair of video frames 200a-200n.

The dotted lines 220a-220n may represent a comparison operation performed by the disparity engine 190c. The disparity engine 190c may perform the comparison operation by determining an offset distance between the feature points 212a-212n of the video frame 200a and the corresponding feature points 214a-214n of the video frame 200b. The dotted lines 220a-220n may be a visual representation of the comparison performed by the disparity engine 190c. The disparity engine 190c may measure the distance between the location of the feature points 212a-212n and the feature points 214a-214n (e.g., a horizontal distance in the example shown).

The disparity engine 190c may be configured to perform geometric and/or trigonometric calculations based on the measured distances between the feature points 212a-212n and the feature points 214a-214n and the characteristics of the stereo pair of capture devices 104a-104b. The calculations performed by the disparity engine 190c may determine the relative distance of the object 210 from the stereo pair of capture devices 104a-104b. The calculations performed by the disparity engine 190c may determine the relative velocity of the object 210 with respect to the stereo camera 100 by comparing the stereo pair of images 200a-200b captured over time (e.g., by analyzing a sequence of stereo pairs of images and comparing the change in relative distance between the object 210 and the stereo pair of capture devices 104a-104b over the time the images were captured). Details of the disparity operations performed by the disparity engine 190c may be described in association with FIG. 5.

The disparity engine 190c may determine the distance of the object 210. By knowing the distance, the disparity engine 190c may determine (e.g., measure) the physical width of the object 210. A width W is shown above the object 210 in the video frame 200a. The width W may represent the physical width of the vehicle 202. In an example, the disparity engine 190c may convert the number of pixels of the object 210 to a width measurement (e.g., feet, inches, meters, etc.) based on the distance determined using the comparison operations and/or the pre-determined distance from the stereo camera 100. In an example, the conversion of the number of pixels to the width measurement may be determined using the geometric and/or trigonometric calculations based on the measured distances between the feature points 212a-212n and the feature points 214a-214n and the characteristics of the stereo pair of capture devices 104a-104b.

Figure 5:
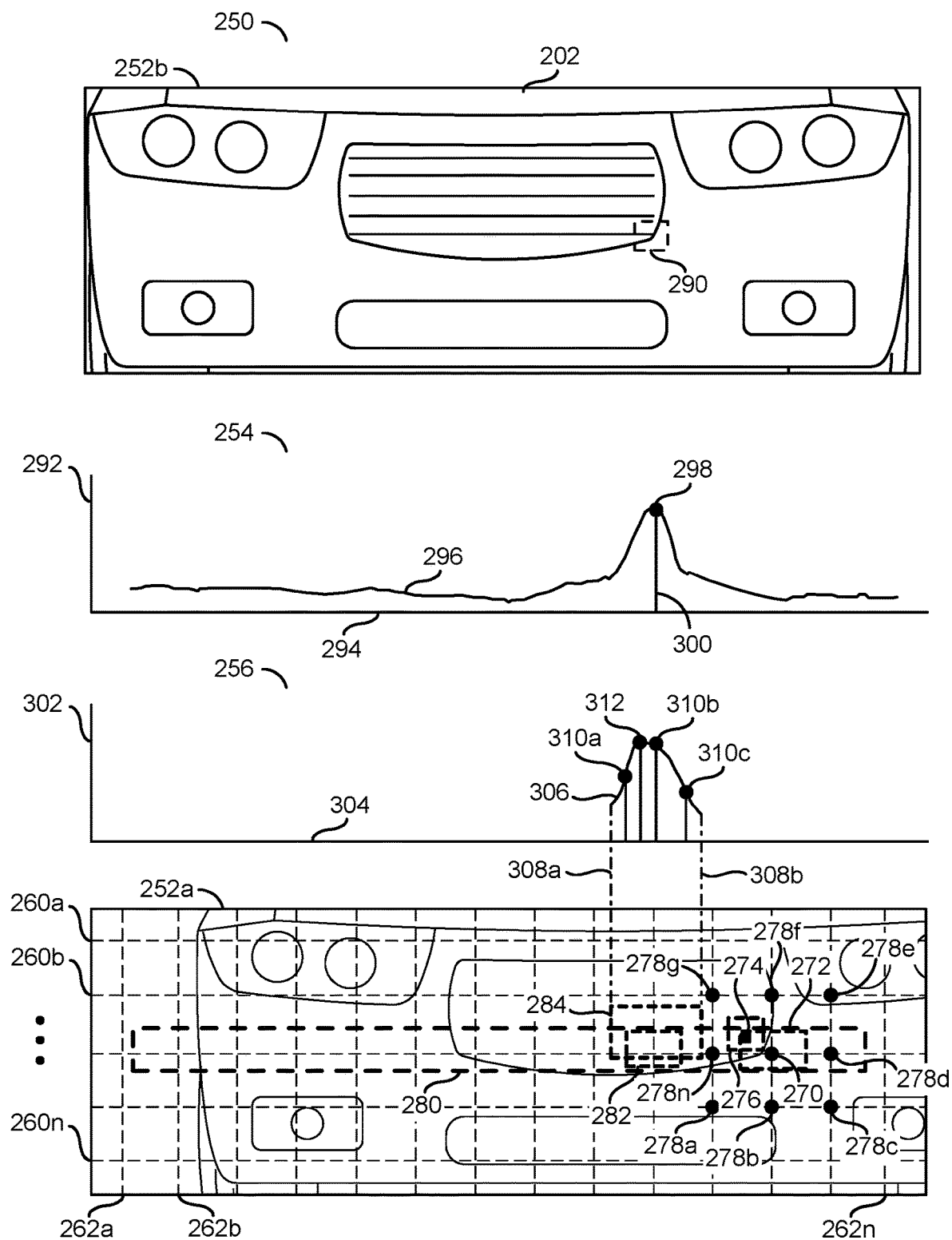
FIG. 5 is a diagram illustrating generating disparity values using guide nodes.

Referring to FIG. 5, a diagram illustrating generating disparity values using guide nodes is shown. An example representation of the disparity calculation 250 is shown. The example representation of the disparity calculation 250 may comprise portions of images 252a-252b, a graph 254 and a graph 256. The example portions of images 252a-252b may be portions of the example stereo images 200a-200b. In an example, the portion 252a may be a portion of the reference image 200b shown in association with FIG. 4 and the portion 252b may be a portion of the target image 200a shown in association with FIG. 4. The portions 252a-252b are shown for illustrative purposes of the disparity calculations performed by the disparity engine 190c. Generally, the disparity calculations are performed by the disparity engine 190c for the entire stereo images 200a-200b.

The target image portion 252a may comprise video data of the vehicle 202 (e.g., the object 210) shown in the video frame 200b shown in association with FIG. 4 (e.g., a front grille of the vehicle 202 is shown as an example). The target image 252a is shown comprising dotted lines 260a-260b and dotted lines 262a-262n. The dotted lines 260a-260b may be horizontal lines across the target image 252a and the dotted lines 262a-262n may be vertical lines across the target image 252a. The horizontal lines 260a-260n and the vertical lines 262a-262n may form a grid pattern across the target image 252a. The grid pattern formed by the horizontal lines 260a-260n and the vertical lines 262a-262n may illustrate boundaries used for guide nodes used for the disparity calculations by the disparity engine 190c.

A pixel 270 is shown. The pixel 270 may be a center pixel for a guide node. The center pixel 270 may be a guide node pixel. The disparity engine 190c may be configured to perform disparity operations over a full search range to determine a peak matching location for the center pixel 270 of a guide node.

A dotted box 272 is shown. The dotted box 272 may be located around the center pixel 270. The dotted box 272 may comprise a block of pixels. The pixel block 272 may comprise the center pixel 270 and a number of nearby pixels (e.g., a center pixel block). In some embodiments, the center pixel block 272 may comprise only pixels adjacent to the center pixel 270. In some embodiments, the center pixel block 272 may comprise the pixels adjacent to the center pixel 270 and other pixels near the center pixel 270. The disparity engine 190c may be configured to crop the center pixel block 272 from the target image 252a to perform a full range search. The number of pixels in the center pixel block 272 may be varied according to the design criteria of a particular implementation.

A pixel 274 is shown. The pixel 274 may be a surrounding pixel. The surrounding pixel 274 may be another pixel within the guide node comprising the center pixel 270 (e.g., a pixel other than the center pixel 270). For example, the surrounding pixel 274 may be located near the center pixel 270 within the same guide node as the center pixel 270. In one example, the surrounding pixel 274 may be a pixel within the center pixel block 272. In another example, the surrounding pixel 274 may be outside of the center pixel block 272 but still within the guide node of the center pixel 270. In the example shown, one surrounding pixel 274 is labeled. However, the guide node with the center pixel 270 may comprise more than one surrounding pixel (e.g., all of the pixels within the guide node other than the center pixel 270 may be one of the surrounding pixels).

A dotted box 276 is shown. The dotted box 276 may be located around the surrounding pixel 274. The dotted box 276 may comprise a block of pixels. The pixel block 276 may comprise the surrounding pixel 274 and a number of nearby pixels (e.g., a surrounding pixel block). In some embodiments, the surrounding pixel block 276 may comprise only pixels adjacent to the surrounding pixel 274. In some embodiments, the surrounding pixel block 276 may comprise the pixels adjacent to the surrounding pixel 274 and other pixels near the surrounding pixel 274. Depending on the distance of the surrounding pixel 274 from the center pixel 270, the surrounding pixel block 276 may comprise the center pixel 270 or may not comprise the center pixel 270. The disparity engine 190c may be configured to crop the surrounding pixel block 276 from the target image 252a to perform a search in a local range. The number of pixels in the surrounding pixel block 276 may be varied according to the design criteria of a particular implementation.

Locations 278a-278g are shown. The locations 278a-278g may represent boundaries for a guide node. The guide node 278a-278g may comprise the center pixel 270 and surrounding pixels of the center pixel 270 (e.g., the surrounding pixel 274 shown and other pixels near the center pixel 270 within the bounds of the guide node 278a-278g). The guide node 278a-278g may be selected along the grid pattern comprising the horizontal lines 260a-260n and the vertical lines 262a-262n. For example, the disparity engine 190c may be configured to select the guide node 278a-278g having a size (e.g., a size of X by Y) throughout locations on the reference image 200a.

In an example, the disparity engine 190c may select a location for the guide node 278a-278g, perform disparity operations, then select a new location for the guide node 278a-278g at a next location (e.g., an adjacent location) and perform the disparity operations again. The next location for the guide node 278a-278g may be a location that does not overlap the previous location of the guide node 278a-278g. The movement of the guide node 278a-278g may be repeated until disparity operations have been performed for every pixel of the stereo pair of images 200a-200b. In one example, the location of the guide node 278a-278g may slide (or shift) along the grid lines 260a-260n and 262a-262n. The guide node 278a-278g may shift vertically or horizontally. In some embodiments, the guide node 278a-278g may move to locations that are not adjacent to the previous location of the guide node. The size and/or movement of the guide node 278a-278g may be selected for efficient processing of the stereo pair of images 200a-200n (e.g., based on the available portions 252a-252b loaded into a cache memory). The size and/or movement of the guide node 278a-278g may be varied according to the design criteria of a particular implementation.

A dotted box 280 is shown. The dotted box 280 may be a search range. The search range 280 may be a representation of a full search range. The full search range 280 may be a group of locations that the disparity engine 190c performs the disparity operations for the center pixel 270. For example, the disparity engine 190c may perform comparison operations between the target image 200b and the reference image 200a to determine a most likely matching location for the center pixel 270. The comparison operations may comprise performing block matching of the center pixel block 272 at multiple locations within the full search range 280 to generate matching scores. The full search range 280 may be similar to a search range used for all pixels when a BM technique is implemented.

A dotted box 282 is shown. The dotted box 282 may represent a guide node pixel peak location. The guide node pixel peak location 282 may be the location within the full search range 280 with the highest matching score generated in response to performing the block matching operations between the target image 252a and the reference image 252b. In an example, the disparity engine 190c may determine the shift offset (e.g., a disparity value) for the center pixel 270 based on the guide node pixel peak location 282. The guide pixel peak location 282 may be used as the disparity value for the disparity map.

A dotted box 284 is shown. The dotted box 284 may be a search range. The search range 284 may be a representation of a local search range. The local search range 284 may be a group of locations that the disparity engine 190c performs the disparity operations for the surrounding pixels of the center pixel 270 within the guide node 278a-278g. For example, the disparity engine 190c may perform comparison operations between the target image 200b and the reference image 200a to determine a most likely matching location for the surrounding pixel 274 (and other surrounding pixels). The comparison operations may comprise performing block matching of the surrounding pixel block 276 at multiple locations within the local search range 284 to generate matching scores.

The local range 284 may be smaller than the full search range 280. The number of locations that the disparity engine 190c performs the disparity operations (e.g., the block matching) may be fewer in the local search range 284 for the surrounding pixels than in the full search range 280 for the center pixel 270. In one example, the disparity engine 190c may perform the block matching operations at three locations within the local search range 284.

In the example shown, the local search range 284 may correspond to the surrounding pixel 274. The disparity engine 190c may determine the matching scores at the locations in the local search range 284 (e.g., generate three matching scores). The matching scores may be generated in response to performing the block matching operations between the target image 252a and the reference image 252b within the local search range 284. The disparity engine 190c may determine the shift offset peak location (e.g., a disparity value) for the surrounding pixel 274 based on calculating a peak location of a paracurve defined by the matching scores determined at the locations within the local search range 284. The shift offset peak location may be used as the disparity value for the surrounding pixel. In the example shown, one local search range 284 is shown corresponding to the surrounding pixel 274. The disparity engine 190c may select the local search range 284 for each of the surrounding pixels in the guide node 278a-278g to determine the shift offset peak location.

A dotted box 290 is shown on the target image portion 252b. The dotted box 290 may be a pixel on the target image portion 252b that corresponds to the center pixel 270 on the reference image portion 252a (e.g., a matching pixel). In the example shown (e.g., for a horizontally oriented stereo camera as shown in association with FIG. 2), the matching pixel 290 may be offset (e.g., shifted horizontally) from the center pixel 270. In some embodiments, the matching pixel 290 may be offset vertically from the center pixel 270 (e.g., for a vertically oriented stereo camera as shown in association with FIG. 1). For example, the matching pixel 290 may be aligned with the guide pixel peak location 282 in the full search range 280 (e.g., if the reference image portion 252a was overlaid on top of the target image portion 252b). The matching pixel 290 may be offset due to the distance and/or angle between the stereo lenses 106a-106b. The offset between the center pixel 270 and the matching pixel 290 may vary at different locations in the reference image 200a and the target image 200b. For example, the differences in offset may be due to the angle between the lenses 106a-106b, vibration of the lenses 106a-106b, a distance of the object from the lenses 106a-106b, etc.

The graph 254 may comprise a Y axis 292 and an X axis 294. The Y axis 292 may represent a matching score value determined by the disparity engine 190c for the center pixel block 272 at various locations in the full search range 280. The X axis 294 may represent a horizontal (e.g., X) pixel location of the reference image 252a and the target image 252b. For example, the X axis 294 may represent where in the stereo pair of images 252a-252b that the matching score was calculated.

A plot 296 is shown. The plot 296 may represent the matching score values generated by the disparity engine 190c along the full search range 280. The plot 296 is shown having generally the same width as the full search range 280. The plot 296 illustrates generally lower matching scores to the left and the far right. A point 298 is shown on the plot 296. The point 298 may represent the guide pixel peak location. A line 300 is shown extending from the guide pixel peak location 298. The line 300 may align with the location of the matching pixel 290 in the target image portion 252b and the guide pixel peak location 282 shown in the full search range 280 in the reference image portion 252a. The matching score for the guide pixel peak location 298 may be the disparity value used for the center pixel 270 in the guide node 278a-278g.

The graph 256 may comprise a Y axis 302 and an X axis 304. The Y axis 302 may represent a matching score value determined by the disparity engine 190c for the surrounding pixel block 276 at various locations in the local search range 284. The X axis 304 may represent a horizontal (e.g., X) pixel location of the reference image 252a and the target image 252b for the local search range 284. For example, the X axis 304 may represent where in the stereo pair of images 252a-252b that the matching score was calculated.

A plot 306 is shown. The plot 306 may represent the matching score values generated by the disparity engine 190c along the local search range 284. Lines 308a-308b are shown extending down from the plot 306 to the edges of the local search range 284. The plot 306 is shown having generally the same width as the local search range 284 (e.g., a smaller width than the plot 296 that corresponds to the full search range 280). Since the disparity engine 190c selects the location of the local search range 284 based on the guide pixel peak location 282, the matching scores for the surrounding pixel block 276 may be generally high over the entire local search range 284. The plot 306 is shown with generally high matching score values.

Points 310a-310c are shown on the plot 306. The points 310a-310c may represent the matching score values calculated by the disparity engine 190c at the locations in the local search range 284. Since the disparity engine 190c may only calculate three locations for the surrounding pixel block 276 in the local search range 284, the plot 306 is shown with only the calculated matching scores 310a-310c.

The plot 306 may be a paracurve. While the graph 256 shows the paracurve 306 as being linear, the disparity engine 190c may only calculate the discrete points 310a-310c. A curve near the peak location for the surrounding pixel 274 may act as a paracurve, defined as the equation (e.g., EQ1):

$$y = ax^2 + bx + c \qquad (EQ1)$$

The disparity engine 190c may be configured to formulate the paracurve 306 based on the calculated matching scores 310a-310c. The calculated matching scores 310a-310c generated from the three interval block matching operations performed in the local search range 284 may be used as three points that define the paracurve 306. For example, the calculated matching scores 310a-310c may be points on the graph 256 (e.g., P1(x1,y1), P2(x2,y2) and P3(x3,y3)). The disparity engine 190c may calculate the coefficient values of a, b and c that define the paracurve 306.

A point 312 is shown on the paracurve 306. The point 312 may be the shift offset peak location. The shift offset peak location 312 may be the peak location defined by the paracurve 306. The disparity engine 190c may be configured to calculate the shift offset peak location 312 from the paracurve 306 defined by the calculated matching scores 310a-310c. For example, the shift offset peak location 312 may be determined from the coefficients of the paracurve 306. The formula for determining the shift offset peak location 312 from the paracurve 306 may be defined by the equation (e.g., EQ2). The shift offset peak location 312 may be the disparity of the surrounding pixel 274 in the guide node 278a-278g.

$$x = -b/(2*a) \qquad (EQ2)$$

The disparity engine 190c may be configured to determine the shift offset peak location 312 based on the matching scores 310a-310c using the equation EQ2. Since the shift offset peak location 312 is determined from the equation EQ2, as opposed to a direct block matching operation, the shift offset peak location 312 may be a sub-pixel value. Determining the shift offset peak location 312 at a sub-pixel value may enable precise values to be generated for the surrounding pixels in the guide node 278a-278g. The precise values may enable the stereo image to be generated without waveform distortions.

Figure 6:
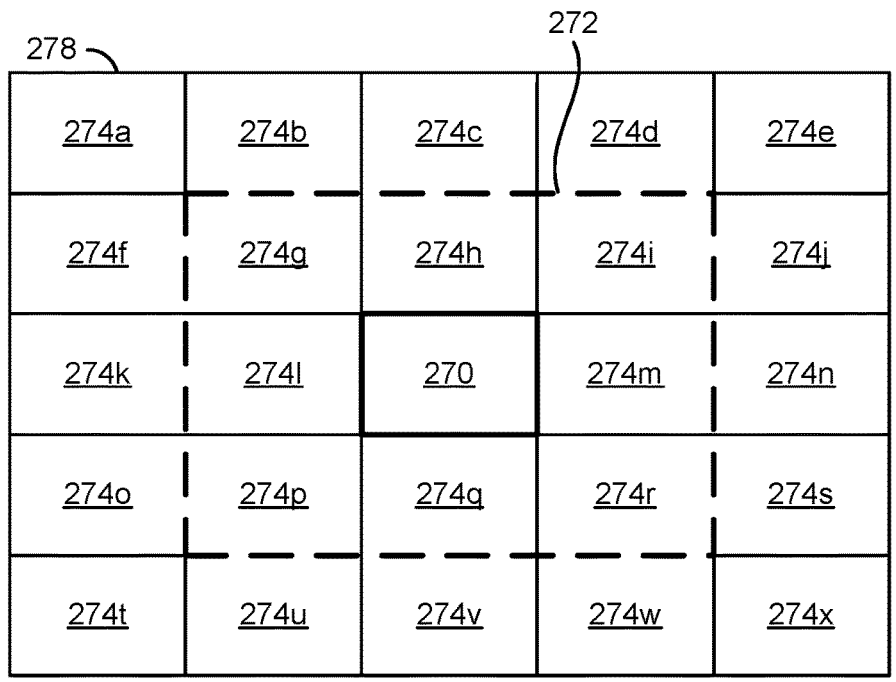
FIG. 6 is a diagram illustrating pixels in a guide node.

Referring to FIG. 6, a diagram illustrating pixels in a guide node is shown. The guide node 278 is shown. The guide node 278 may be a representative example of the guide nodes selected by the disparity engine 190c in the reference image 200a.

The guide node 278 may comprise the center pixel 270, the center pixel block 272 and multiple surrounding pixels 274a-274x. In the example shown, the guide node 278 may comprise 25 pixels. For example, the guide node 278 may comprise a 5×5 grid of pixels from the reference image 200a. In the example shown, the center pixel 270 may be the pixel located at the 3,3 location in the guide node 278. In some embodiments, the guide node 278 may be larger or smaller than a 5×5 grid of pixel data. For example, the guide node 278 may be implemented as a 10×10 grid of pixels. In the example shown, the guide node 278 may have an equal width and height. In some embodiments, the guide node 278 may have a longer height than width or a longer width than height. In some embodiments, the center pixel 270 may not be a single pixel located at the exact center of the guide node 278. In some embodiments, the guide node 278 may have a non-rectangular shape (e.g., a shape that generally forms a diamond, a circle, an oval, a star, etc.). The size, shape and/or number of surrounding pixels in the guide node 278 may be varied according to the design criteria of a particular implementation.

The center pixel block 272 is shown. The center pixel block 272 may comprise the center pixel 270 and multiple of the surrounding pixels 274a-274x. In the example shown, the center pixel block 272 may be a 3×3 block of pixels within the guide node 278. In the example shown, the center pixel block 272 may comprise the directly adjacent surrounding pixels 274g, 274h, 274i, 274l, 274m, 274p, 274q and 274r. In some embodiments, the center pixel block 272 may comprise other of the surrounding pixels 274a-274x (e.g., pixels that are more than one pixel away from the center pixel 270). The size, shape and/or number of pixels in the center pixel block 272 may be varied according to the design criteria of a particular implementation.

The disparity engine 190c may be configured to determine the guide pixel peak location 282 using the pixels in the center pixel block 272. After the guide pixel peak location 282 has been determined, the disparity engine 190c may select the local search range 284 and determine the shift offset peak location 312 based on the calculated paracurve 306. The shift offset peak location 312 may be determined for each of the surrounding pixels 274a-274x within the guide node 278. For example, for each guide node 278 generated, the disparity engine 190c may perform block matching over the full search range 280 once for the center pixel 270 and then perform the block matching (e.g., three calculations) over the local search range 284 for every one of the surrounding pixels 274a-274x. For the example of the 5×5 guide node 278 shown, the disparity engine 190c may perform 72 block matching operations in the local range 284 for the surrounding pixels 274a-274x (e.g., three calculations for each of the 24 surrounding pixels).

Figure 7:
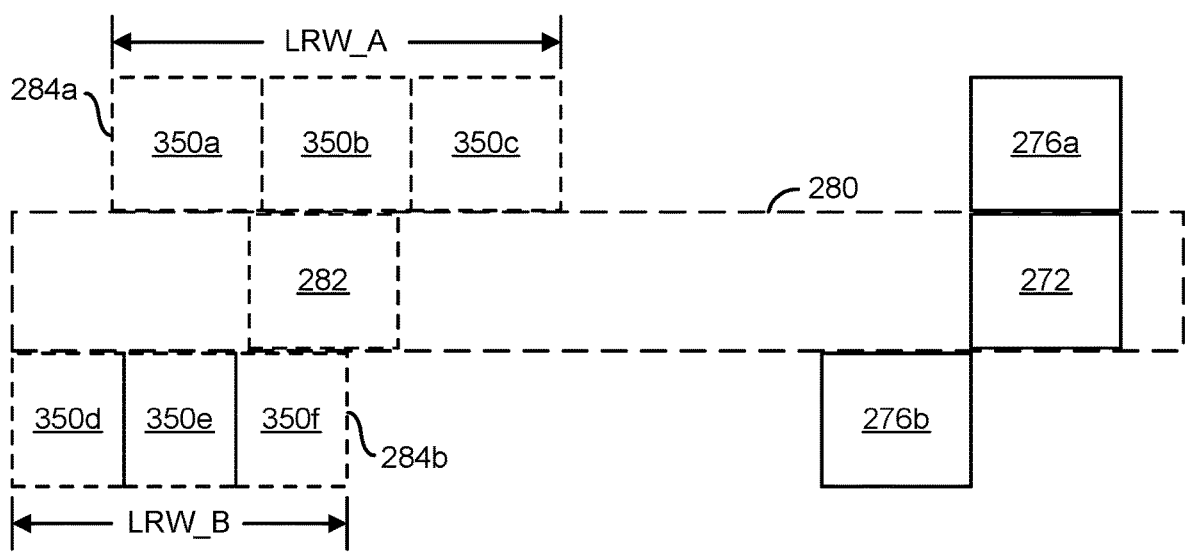
FIG. 7 is a diagram illustrating a full search range and a local search range.

Referring to FIG. 7, a diagram illustrating a full search range and a local search range is shown. The full search range 280 is shown. The center pixel block 272 is shown within the full search range 280. The guide pixel peak location 282 is shown with in the full search range 280.

The disparity engine 190c may perform the block matching calculations for each of a number of locations in the full search range. One matching score may be generated based on a comparison of the pixels in the center pixel block 272 in the reference image 200a and the pixels at the X and Y locations in the target image 200b that correspond to each of the locations in the full search range 280. The location in the full search range 280 that has the highest matching score may be the guide pixel peak location 282. The number of block matching operations performed for the center pixel block 272 in the full search range 280 may depend upon the size of the full search range (e.g., a value of R).

The surrounding pixel block 276a is shown. The surrounding pixel block 276a is shown adjacent to the center pixel block 272. In one example, the surrounding pixel block 276a may comprise a 3×5 grid of pixels above the center pixel block 272. In the example shown in association with FIG. 6, the surrounding pixel block 276a for the surrounding pixel 274h (e.g., the pixel directly above the center pixel 270) may comprise the surrounding pixels 274a, 274b, 274c, 274d, 274e, 274f, 274g, 274h, 274i, 274j, 274k, 274l, 274m, 274n and the center pixel 270.

The local range 284a is shown. The local range 284a may be at a location near the guide pixel peak location 282. Since the shift offset for the surrounding pixels 274a-274x in the guide node 278 may be generally close to the shift offset for the center pixel 270, the location of the local range 284a may be selected by the disparity engine 190c at a location near the guide pixel peak location 282. In the example shown, since the surrounding pixel block 276a is located above the center pixel block 272, then the local search range 284a for the surrounding pixel block 276 may be located above the guide node peak location 282.

The local search range 284a is shown comprising block matching calculation locations 350a-350c. The local search range 284a is shown having a width (e.g., LRW_A). The width LRW_A may comprise a number of pixels (e.g., a range of pixels on the X axis of the reference image 200a). The size of the block matching calculation locations 350a-350c may be selected based on the width LRW_A.

The local search range 284a may comprise three of the block matching calculation locations 350a-350c to generate locations for the points 310a-310c on the paracurve 306. Since a minimum of three points 310a-310c may be used to define the paracurve 306, the local search range 284a may not need to comprise more than three block matching calculation locations 350a-350c. One matching score may be generated based on a comparison of the pixels in the surrounding pixel block 276a in the reference image 200a and the pixels at the X and Y locations in the target image 200b that correspond to each of the locations of the block matching calculation locations 350a-350c.

The surrounding pixel block 276b is shown. The surrounding pixel block 276b is shown diagonally adjacent to the center pixel block 272. In one example, the surrounding pixel block 276b may comprise a 3×3 grid of pixels to the left and below the center pixel block 272. In the example shown in association with FIG. 6, the surrounding pixel block 276b for the surrounding pixel 274p (e.g., the pixel directly down and to the left of the center pixel 270) may comprise the surrounding pixels 274k, 274l, 274o, 274p, 274q, 274t, 274u, 274v and the center pixel 270.

The local range 284b is shown. The local range 284b may be at a location near the guide pixel peak location 282. Since the shift offset for the surrounding pixels 274a-274x in the guide node 278 may be generally close to the shift offset for the center pixel 270, the location of the local range 284b may be selected by the disparity engine 190c at a location near the guide pixel peak location 282. In the example shown, since the surrounding pixel block 276b is located below and to the left of the center pixel block 272, then the local search range 284b for the surrounding pixel block 276b may be located below and to the left of the guide node peak location 282.

The local search range 284b is shown comprising block matching calculation locations 350d-350f. The local search range 284b is shown having a width (e.g., LRW_B). The width LRW_B may comprise a number of pixels (e.g., a range of pixels on the X axis of the reference image 200a). The size of the block matching calculation locations 350d-350f may be selected based on the width LRW_B.

The local search range 284b may comprise three of the block matching calculation locations 350d-350f to generate locations for the points 310a-310c on the paracurve 306. Since a minimum of three points 310a-310c may be used to define the paracurve 306, the local search range 284b may not need to comprise more than three block matching calculation locations 350d-350f. One matching score may be generated based on a comparison of the pixels in the surrounding pixel block 276b in the reference image 200a and the pixels at the X and Y locations in the target image 200b that correspond to each of the locations of the block matching calculation locations 350d-350f.

The width LRW_A for the local search range 284a is shown as wider than the width LRW_B for the local search range 284b. In the example described, the size of the surrounding pixel block 276a (e.g., a 3×5 block) may be wider than the size of the surrounding pixel block 276b (e.g., a 3×3 block). The disparity engine 190c may select the size of the local search range 284 based on the size of the surrounding pixel block 276. In some embodiments, each of the local search ranges 284a-284x selected by the disparity engine 190c may be the same size for each of the surrounding pixels 274a-274x. In some embodiments, one or more of the local search ranges 284a-284x selected by the disparity engine 190c may be a different size for the surrounding pixels 274a-274x. The size (e.g., width) of the local search range 284 and/or the criteria of selecting a particular width of the local search range 284 may be varied according to the design criteria of a particular implementation.

The local search range 284a and/or the local search range 284b are each shown near the center pixel peak location 282. The disparity engine 190c may be configured to define the local search range 284 for the surrounding pixels 274a-274x that generally align the center of the local search range 284 with the center pixel peak location 282. The boundaries of the local search range 284 may then be expanded by a number of pixels to the left and/or to the right of the center pixel peak location 282. The number of pixels to the left and/or right and/or the location of the local search range 284 may be determined in response to the relative location of the particular surrounding pixels 274a-274x with respect to the center pixel 270. In some embodiments, the same local search range 284 may be used for each of the surrounding pixels 274a-274x. In some embodiments, more than one local search range location may be used for the surrounding pixels 274a-274x. In one example, if the paracurve 296 around the peak location 298 of center pixel 270 is narrow (e.g., the paracurve 296 looks like a sharp impulse), then the local search range 284 may be selected having a narrower width for the surrounding pixels 274a-274x. The location and/or width of the local search range 284 and/or the criteria of selecting the location of the local search range 284 may be varied according to the design criteria of a particular implementation.

In the example shown, since two of the surrounding pixel blocks 276a-276b are shown as a representative example, two corresponding local search ranges 284a-284b are shown. Generally, the disparity engine 190c may repeat the selection of a location of the local search range 284 near the guide pixel peak location 282 for each surrounding pixel block for each of the surrounding pixels 274a-274x. For example, each local search range 284 for the corresponding surrounding pixels 274a-274x may be near the guide pixel peak location 282 with a slightly different location (or the same location) based on the direction and/or distance of the surrounding pixels 274a-274x with respect to the center pixel 270.

In the example shown, the full search range 280 and the local search ranges 284a-284b are shown in a horizontal configuration. For example, the full search range 280 and the local search ranges 284a-284b may be used to determine a horizontal offset of pixels between the reference image 200a and the target image 200b. The horizontal offset may be applicable to the horizontal stereo camera shown in association with FIG. 2. In embodiments of the stereo camera 100 with the vertical orientation (as shown in association with FIG. 1), the full search range 280 and the local search ranges 284a-284b may have a vertical orientation for determining a vertical offset (e.g., a vertical disparity) between a top image and a bottom image for the reference image 200a and the target image 200b. The orientation of the full search range 280 and the local search ranges 284 and/or the type of disparity calculated by the disparity engine 190c may be varied according to the orientation of the lenses 106a-106b.

The disparity engine 190c may select the location for the guide node 278 from the pixels in the reference image 200a. The disparity engine 190c may perform the block matching calculations between the center pixel block 272 in the reference image 200a and the corresponding (e.g., same X and Y pixel locations) in the target image 200b. The block matching calculations for the center pixel block 272 may be performed over the entire full search range 280 in order to determine the guide node pixel peak location 282.

For example, for each guide node 278, the disparity engine 190c may crop the center pixel block 272 from the target image 200a. Within the full search range 282, the center pixel block 272 may be shifted pixel by pixel to calculate the matching scores with the corresponding pixels in the target image 200b (e.g., an overlapped block in the target image 200b). The matching score paracurve 296 (shown in association with FIG. 5) may be generated to determine the matching similarity between the reference image 200a and the target image 200b for the center pixel block 272. The peak location 298 in the matching score curve 296 may be used to determine the shift offset disparity for the center pixel 270.

Since the disparity for the surrounding pixels 274a-274x in the same guide node 278 may be close to the disparity of the center pixel 270, the local search range 284 may be used for each of the surrounding pixels 274a-274x. For each of the surrounding pixels 274a-274x, the disparity engine 190c may select the local search range 284 near the guide pixel peak location 282, determine the block matching scores for each one of the block matching calculation locations 350a-350c in the local search range 284a, and define the paracurve 306 using the matching scores from each of the block matching calculation locations 350a-350c (or the matching locations 350d-350f for the local search range 284b or other matching locations based on the local search range). The shift offset peak location 312 may be determined by calculating the peak of the paracurve 306 defined by the block matching calculation locations 350a-350c. The shift offset disparity for the center pixel 270 may be used as a disparity value in a disparity map generated by the disparity engine 190c. The value of the shift offset peak location 312 for each of the surrounding pixels 274a-274x may be respectively used as the disparity values in the disparity map generated by the disparity engine 190c.

Block matching techniques may be used to determine the disparity values. Block matching techniques may be brute and have a high computational complexity. Block matching techniques may calculate the block matching scores over the full search range 280 for every pixel in the reference image 200a. For example, if the reference image 200a and the target image 200b have a size of H,W (e.g., X,Y), and the full search range 280 is R, then the computational complexity of the block matching techniques may be O(H*W*R) to build the whole disparity map.

The disparity engine 190c may use the guide node 278 to reduce the computational complexity compared to the block matching techniques. The block matching calculations may be performed for the full search range for only the center pixel 270 for each guide node 278 in the reference images 200a. Instead of performing the block matching calculations over the full search range 280 for each of the surrounding pixels 274a-274x in each guide node 278, the amount of calculations may be reduced by performing only three calculations in the local search range 284. The guide node 278 may be defined to ensure that the surrounding pixels 274a-274x have a disparity value close to the disparity value of the center pixel 270 (e.g., if random pixels were selected, there may not be close disparity values).

For example, if the guide node 278 comprises a 10 by 10 grid of pixels (e.g., 100 pixels) for the image of size H by W and the full search range 280 of R, then the disparity engine 190c may determine the disparity value for the center pixel 270 with H×W×R/100 block matching calculations and then H×W×3×99/100 (e.g., approximately 3×H×W) block matching calculations for the surrounding pixels. The total computational complexity for generating the disparity values using the guide node may be O(H*W*(0.01R+3)). In an example where the R value for the full search range 280 is 128, then the computational complexity using the guide node 278 may be O(H*W*4.28), which is significantly less than the computational complexity for block matching techniques, which may be O(H*W*128).

Figure 8:
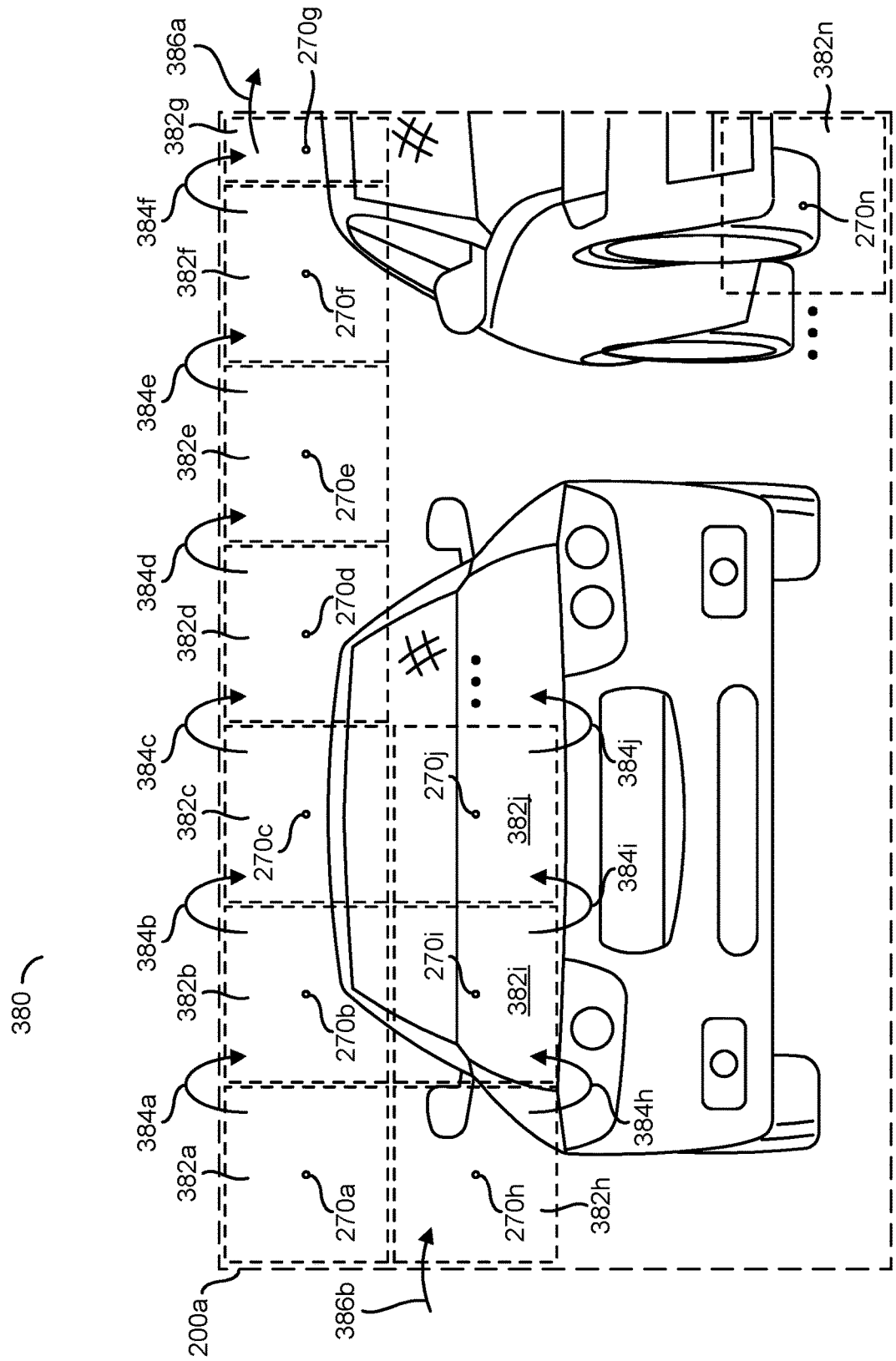
FIG. 8 is a diagram illustrating guide nodes on the reference video frame.

Referring to FIG. 8, a diagram illustrating guide nodes on the reference video frame is shown. An example 380 is shown. The example 380 may comprise the reference video frame 200a. A number of the center pixels 270a-270n are shown on the reference video frame 200a. The number of the center pixels 270a-270n in the reference video frame 200a may be varied according to the design criteria of a particular implementation.

The center pixels 270a-270n are shown spaced apart throughout the reference video frame 200a. In the example 380, the center pixel 270a may be an equal distance in pixels away from the neighboring center pixel 270b (e.g., in an X direction) as the neighboring center pixel 270h (e.g., in a Y direction). In the example 380, the center pixel 270f is a different distance away from the neighboring pixel 270e as the neighboring pixel 270g. The distances between the center pixels 270a-270n may be varied according to the design criteria of a particular implementation.

Dotted boxes 382a-382n are shown on the reference video frame 200a. The dotted boxes 382a-382n may represent the guide node locations selected by the disparity engine 190c for the reference video frame 200a. The guide node locations 382*a*-382*n* may correspond to the respective center pixels 270*a*-270*n*. For example, the guide node location 382*a* may comprise the center pixel 270*a* and the surrounding pixels near the center pixel 270*a* (e.g., the surrounding pixels 274*a*-274*x* shown in association with FIG. 6), the guide node location 382*b* may comprise the center pixel 270*b* and the surrounding pixels near the center pixel 270*b*, etc.

The guide node locations 382*a*-382*n* are shown covering the entirety of the reference video frame 200*a* (e.g., only guide node locations 382*a*-382*j* and 382*n* are shown in FIG. 8 for clarity and illustrative purposes). For example, all of the pixels of the reference video frame 200*a* may be within the guide node locations 382*a*-382*n*. The guide node locations 382*a*-382*n* are shown at distinct locations on the reference video frame 200*a*. For example, none of the guide node locations 382*a*-382*n* overlap with another one of the guide node locations 382*a*-382*n*. In an example, each of the pixels of the reference video frame 200*a* may be within only one of the guide node locations 382*a*-382*n*.

The example 380 may show each of the guide node locations 382*a*-382*n* to illustrate the layout and/or locations of the guide node locations 382*a*-382*n*. In one example, the disparity engine 190*c* may be configured to operate on the pixels of one of the guide node locations 382*a*-382*n* at a time. In some embodiments, the disparity engine 190*c* may be configured to perform various operations for more than one of the guide node locations 382*a*-382*n* in parallel. For example, the disparity engine 270*a* may perform the disparity operations for the surrounding pixels in the guide node location 382*a* while performing the disparity operations for the center pixel 270*b* in the guide node location 382*b*. The order of the disparity operations performed for one or more of the guide node locations 382*a*-382*n* may be varied according to the design criteria of a particular implementation.

Arrows 384*a*-384*j* are shown. The arrows 384*a*-384*j* may illustrate the movement of the location of the disparity calculations. In an example, the disparity engine 190*c* may begin the disparity operations with the guide node location 382*a* (e.g., the top left corner of the reference video frame 200*a*). The disparity engine 190*c* may crop the pixels within the guide node location 382*a* to perform the disparity operations (e.g., the pixels in the guide node location 382*a* may be the guide node 278). For example, the pixels of the guide node location 382*a* may be loaded into the memory 160. The disparity engine 190*c* may determine the disparity value for the center pixel 270*a* using the full search range 280, then use the local search range 284 for the disparity values of the surrounding pixels 270*a*-270*x* of the guide node location 382*a*.

After the disparity operations for the guide node location 382*a* have been performed, the disparity engine 190*c* may move (e.g., as shown by the arrow 384*a*) the guide node 278 to the guide node location 382*b*. The disparity engine 190*c* may crop the pixels within the guide node location 382*b* to perform the disparity operations (e.g., the pixels in the guide node location 382*b* may be the guide node 278). For example, the pixels of the guide node location 382*b* may be loaded into the memory 160. The disparity engine 190*c* may determine the disparity value for the center pixel 270*b* using the full search range 280, then use the local search range 284 for the disparity values of the surrounding pixels 270*a*-270*x* of the guide node location 382*b*.

After the disparity operations for the guide node location 382*b* have been performed, the disparity engine 190*c* may move (e.g., as shown by the arrow 384*b*) the guide node 278 to the guide node location 382*c*. The disparity engine 190*c* may perform similar disparity operations for the guide node locations 382*c*-382*g*. For example, the guide node 278 may be shifted (or slide) across the top row of the guide node locations 382*a*-382*g* from left to right until the entire width of the reference video frame 200*a* has been calculated. After the disparity engine 190*c* reaches the end of the top row of guide node locations at the guide node location 382*g*, the disparity engine 190*c* may move to the next row of guide node locations 382*a*-382*n* in the reference video frame 200*a*.

The guide node location 382*g* is shown having a smaller width than the guide node locations 382*a*-382*f*. In some embodiments, each of the guide node locations 382*a*-382*n* may have the same width (e.g., the disparity engine 190*c* may select the side of the guide node locations 382*a*-382*n* such that each guide node locations 382*a*-382*n* have an equal height and width). In some embodiments, the most of the guide node locations 382*a*-382*n* may be selected to be a particular size (e.g., based on the capacity available in the memory 160) and if the particular size does not divide equally there may be one or more guide node locations 382*a*-382*n* with a smaller size. The size of the guide node locations 382*a*-382*n* may be varied according to the design criteria of a particular implementation.

Arrows 386*a*-386*b* are shown representing the guide node 278 moving from the last location in the top row of guide node locations (e.g., 382*g*) to the first location in the second row of guide node locations (e.g., 382*h*). Similar disparity operations may be performed by the disparity engine 190*c* for the next row of guide node locations (e.g., the guide node locations 382*h*-382*j* are shown for the second row of guide node locations). The disparity engine 190*c* may shift the guide node 278 across the next row of guide node locations (e.g., the movement of the guide node may be represented by the arrows 384*h*-384*j*).

The disparity engine 190*c* may continue to slide the guide node 278 across each row of the guide node locations 382*a*-382*n* of the reference video frame 200*a* until reaching the guide node location 382*n* (e.g., the guide node location in the bottom right corner of the reference video frame 200*a*). The disparity operations may be completed for the reference video frame 200*a* when the disparity operations have been finished for the last guide node location 382*n*. In the example 380, the movement of the guide node 278 may be from the left to right across each row of guide node locations 382*a*-382*n* from top to bottom. In some embodiments, the movement of the guide node 278 may be from top to bottom along each column of guide node locations 382*a*-382*n* from left to right (or right to left). The direction of movement of the guide nodes 278 across the guide node locations 382*a*-382*n* may vary according to the design criteria of the particular implementation.

Figure 9:
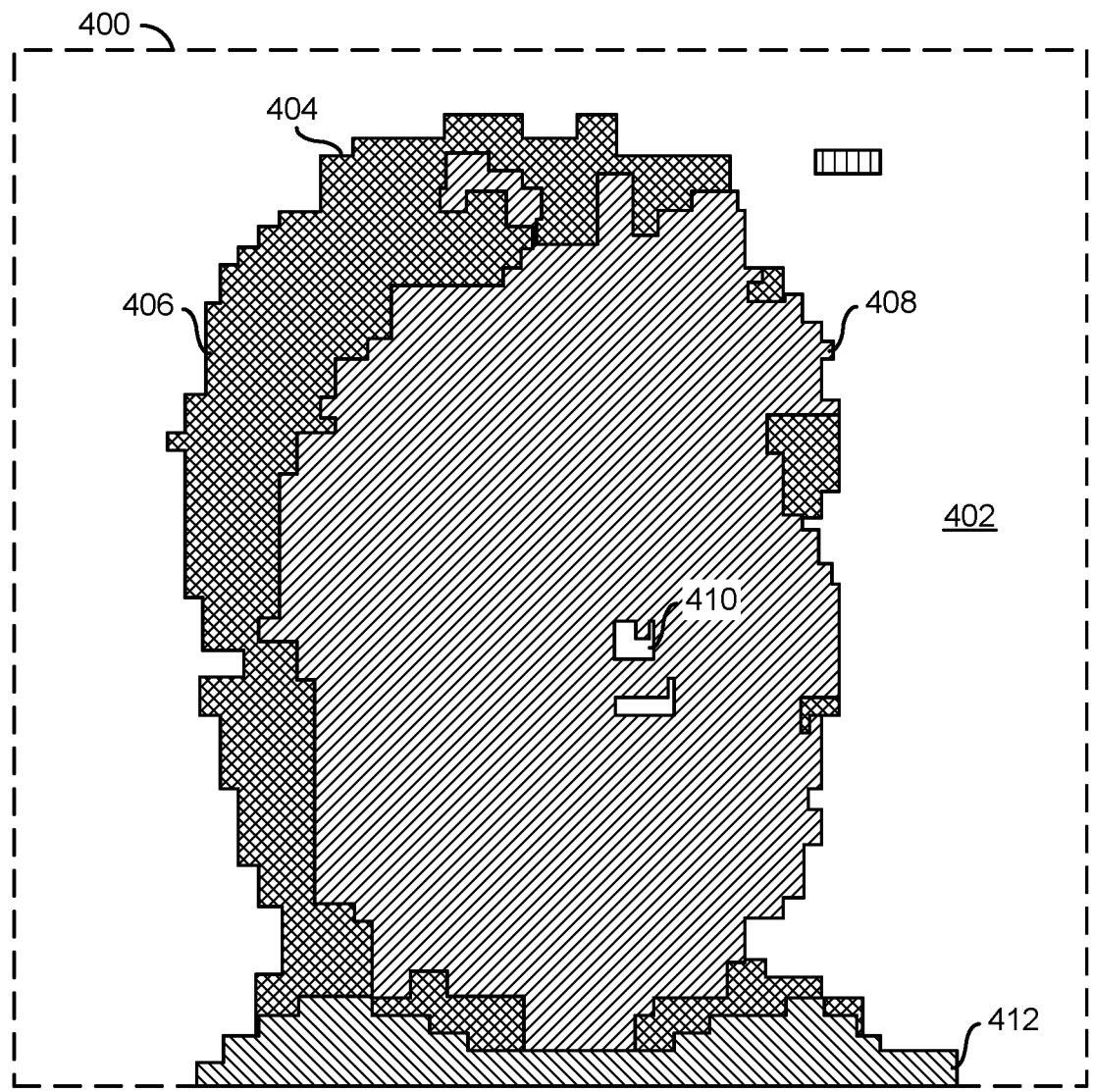
FIG. 9 is a diagram illustrating a disparity map.

Referring to FIG. 9, a diagram illustrating a disparity map is shown. A disparity map 400 is shown. The disparity map 400 may be an illustrative example of a disparity map generated by the processor 102. The disparity map 400 may show the shift of the pixels between reference image 200*a* and the target image 200*b*. The disparity value may be within the R value of the full search range 280. In an example, if the R value for the full search range 280 is 128, then the disparity values for the pixels in the reference image 200*a* may be a value between 0 and 128.

In the example shown, the disparity map 400 may be generated in response to pixel data captured by the capture devices 104*a*-104*b* of a human head 404. The disparity map 400 may comprise regions 402-412. The disparity map 400 may be a simplified version of the disparity maps generated by the processor 102 for illustrative purposes. In some embodiments, the regions 402-412 may be grayscale representations of pixel values in a range from 0 to 255 (e.g., integer values) that cover the disparity range. The disparity values generated for the disparity map 400 may be determined using the guide nodes.

In an example, the region 402 may represent pixels with disparity values in a first range of values (e.g., locations behind the person 404), the region 406 may represent pixels with disparity values in a second range of values (e.g., locations that generally correspond to the hair and/or top of the head of the person 404), the region 408 may represent pixels with disparity values in a third range of values (e.g., locations that generally correspond to the face of the person 404), the region 410 may represent pixels with disparity values in a fourth range of values (e.g., locations that generally correspond to the nose of the person 404, and the region 412 may represent pixels with disparity values in a fifth range of values (e.g., locations that generally correspond to the shoulders of the person 404). Generally, pixels within the respective regions 402-412 may have generally similar (but not necessarily matching) disparity values. Since the disparity values in the respective regions 402-412 may have generally similar values, the local search regions 284 may be used for the surrounding pixels 274a-274x in the guide node 278.

Determining the shift offset peak locations 312 for the surrounding pixels 274a-274x based on calculating the para-curve 306 may enable the disparity engine 190c to generate disparity values at a sub-pixel level. Generating the disparity values at a sub-pixel level may enable the disparity map 400 to be generated with less noise compared to a disparity map generated using block matching techniques. For example, noise may be represented as outlier values in the regions 402-412.

In some embodiments, the difference in disparity values determined using block matching techniques and using the guide nodes may be small. In one example, a disparity value determined using block matching techniques may be approximately 80 while the same disparity value determined using the guide node may be 80.3. The small difference may be a result of the sub-pixel accuracy enabled by the guide node operations. While the sub-pixel accuracy may not be visible in the disparity map 400 (e.g., due to the small difference in value), the sub-pixel accuracy may have an impact in a stereo image generated. For example, the sub-pixel accuracy may prevent wave form distortion in a stereo image.

Figure 10:
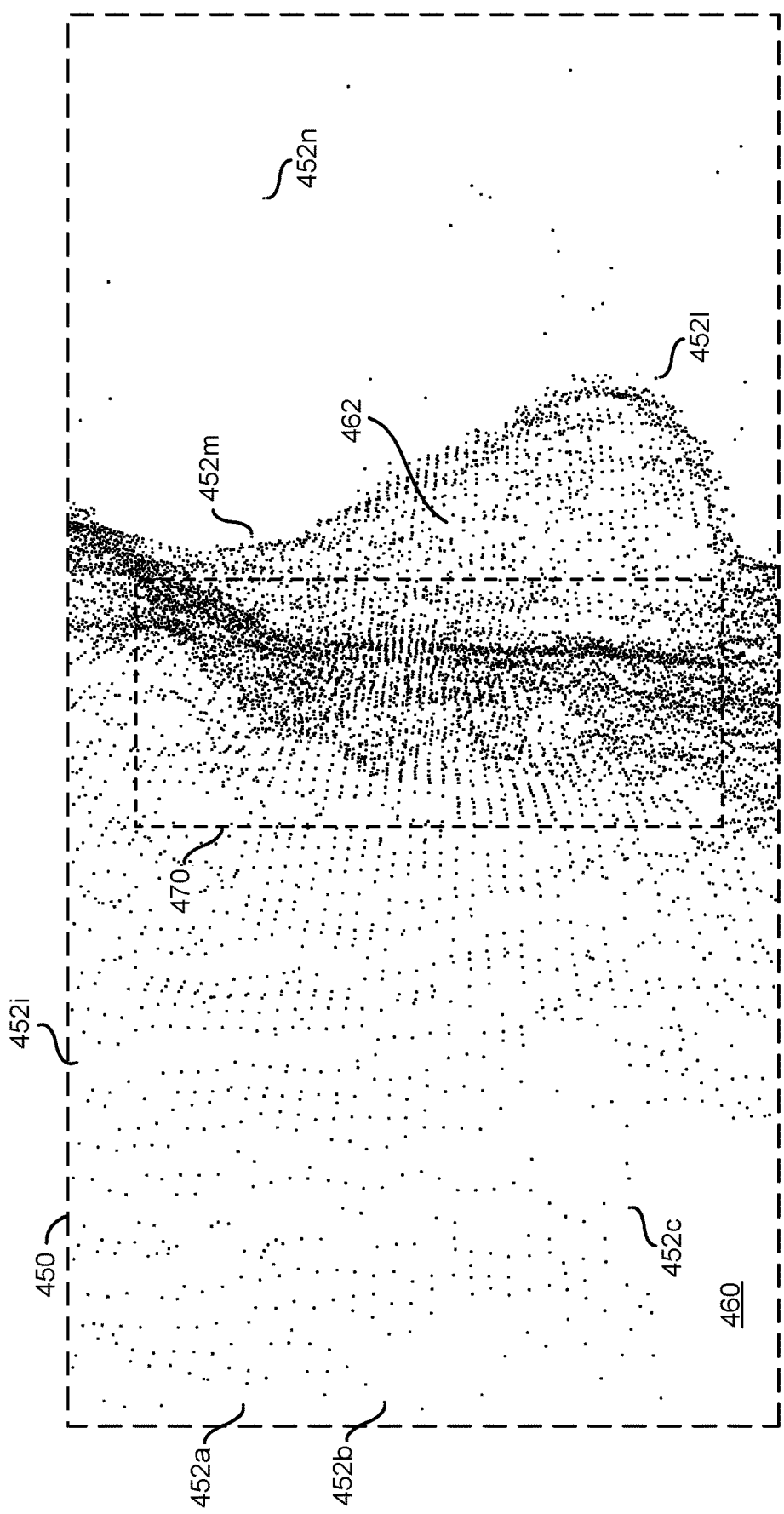
FIG. 10 is a diagram illustrating a stereo vision image.

Referring to FIG. 10, a diagram illustrating a stereo vision image is shown. An example stereo vision image 450 is shown. The stereo vision image 450 may comprise a surface of a 3D object. The stereo vision image 450 may be comprised of dots 452a-452n. The dots 452a-452n may represent the surface of the 3D object. In the example shown, the 3D object may comprise a face 460. A nose 462 is shown on the face 460.

The dots 452a-452n may be generated by the disparity engine 190c in response to the disparity values generated using the guide nodes. The disparity values may be used by the disparity engine 190c, along with other values (e.g., the focal length of the capture devices 104a-104b, the distance between focus of the two capture devices 104a-104b, etc.) to represent the surface of the 3D object. Using the guide nodes to generate the disparity values may ensure that mismatch (e.g., a non-optimal disparity value is found) is limited.

A dotted box 470 is shown. The dotted box 470 may comprise a subset of the dots 452a-452n that corresponds to a cheek and the nose 462 of the face 460. The dotted box 470 may represent a complex area of the face 460 (e.g., a relatively large change in distance from the lenses 106a-106b in a small area of the face 460). The dots 452a-452n in the box 470 illustrate a relatively smooth transition. Mismatches may result in noise (e.g., due to outlier values). Calculating the disparity values using the guide nodes 278 may ensure that there may be few mismatch disparity values generated (e.g., fewer than when block matching techniques are used). Wave distortion may not be present in the box 470.

Generally, the risk of mismatch when using the guide node 278 to generate the disparity values may be low. If mismatches do occur, the processor 102 may be configured to detect mismatches. Mismatches may be corrected using post-processing implemented by the processor 102. In one example, a full range search may be performed to detect mismatches for the surrounding pixels 274a-274x.

The sub-pixel accuracy of the disparity values generated when using the guide nodes may prevent waveform distortion. Waveform distortions may appear as 'slices' of the dots 452a-452n. In the box 470, the dots 452a-452n are shown as distributed averagely (e.g., a smooth transition). In an example, the waveform distortion may be present in a stereo image generated using the block matching techniques, but may not be present in the stereo image 450 shown.

Figure 11:
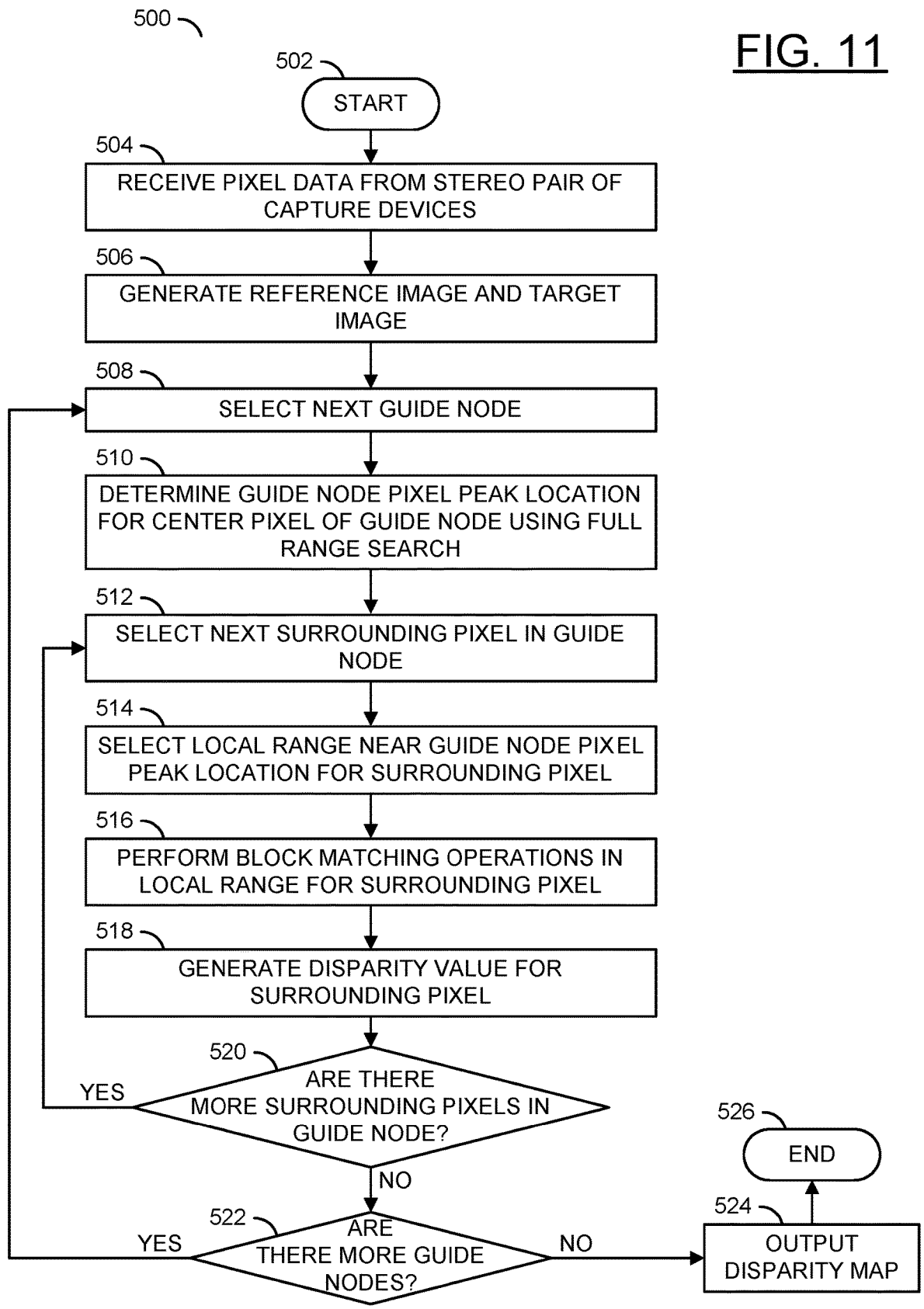
FIG. 11 is a flow diagram illustrating a method for building disparity maps using guide nodes.

Referring to FIG. 11, a method (or process) 500 is shown. The method 500 may build disparity maps using guide nodes. The method 500 generally comprises a step (or state) 502, a step (or state) 504, a step (or state) 506, a step (or state) 508, a step (or state) 510, a step (or state) 512, a step (or state) 514, a step (or state) 516, a step (or state) 518, a decision step (or state) 520, a decision step (or state) 522, a step (or state) 524, and a step (or state) 526.

The step 502 may start the method 500. In the step 504, the processor 102 may receive the pixel data PIXELD_A-PIXELD_B from the stereo pair of capture devices 104a-104b. Next, in the step 506, the processor 102 may generate the reference image 200a and the target image 200b. For example, the video processing pipeline of the processor 102 may be configured to perform video processing operations on the pixel data PIXELD_A-PIXELD_B to generate the reference image 200a and the target image 200b. Next, the method 500 may move to the step 508.

In the step 508, the disparity engine 190c may select the next guide node 278 on the reference image 200a. In an example, the disparity engine 190c may select the pixels from one of the guide node locations 382a-382n as the next location for the guide node 278. The guide node 278 may correspond to a location of the center pixel 270. Next, in the step 510, the disparity engine 190c may determine the guide node pixel peak location 298 for the center pixel 270 of the guide node 278 using the full search range 280. Next, the method 500 may move to the step 512.

In the step 512, the disparity engine 190c may select a next one of the surrounding pixels 274a-274x within the guide node 278. Next, in the step 514, the disparity engine 190c may select a local search range 284 (e.g., a size and/or location of the local search range 284) for the selected one of the surrounding pixels 274a-274x. In the step 516, the disparity engine 190c may perform block matching operations in the local search range 284 corresponding to the selected one of the surrounding pixels 274a-274x. Next, in the step 518, the disparity engine 190c may generate the disparity value for the selected one of the surrounding pixels

274a-274x in the current guide node 278. Next, the method 500 may move to the decision step 520.

In the decision step 520, the disparity engine 190c may determine whether there are more of the surrounding pixels 274a-274x within the current guide node 278. If there are more of the surrounding pixels 274a-274x within the current guide node 278, then the method 500 may return to the step 512. For example, the disparity engine 190c may determine the disparity values for each of the surrounding pixels 274a-274x within the guide node 278. If there are no more of the surrounding pixels 274a-274x (e.g., the disparity values have been generated for all of the surrounding pixels 274a-274x within the guide node 278), then the method 500 may move to the decision step 522.

In the decision step 522, the disparity engine 190c may determine whether there are more of the guide node locations 382a-382n. If there are more guide node locations 382a-382n, then the method 500 may return to the step 508. For example, the disparity engine 190c may determine the disparity values for the pixels within each of the guide node locations 382a-382n until a disparity value has been generated for all the pixels in the reference video frame 200a. If there are no more of the guide node locations 382a-382n (e.g., the disparity values have been generated for all of the pixels), then the method 500 may move to the step 524. In the step 524, the disparity engine 190c may output the disparity map 400. Next, the method 500 may move to the step 526. The step 526 may end the method 500.

Figure 12:
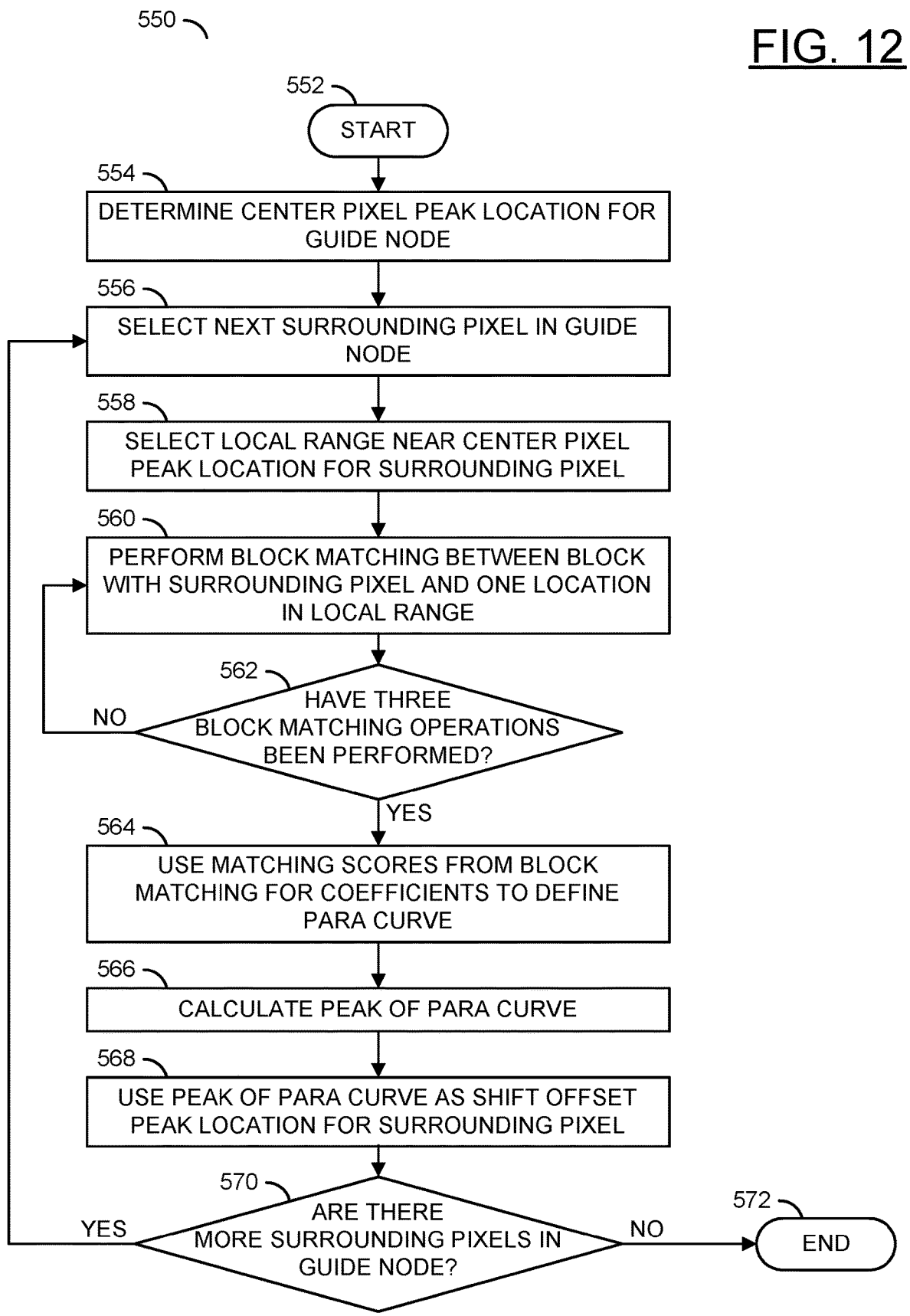
FIG. 12 is a flow diagram illustrating a method for calculating disparity values for surrounding pixels.

Referring to FIG. 12, a method (or process) 550 is shown. The method 550 may calculate disparity values for surrounding pixels. The method 550 generally comprises a step (or state) 552, a step (or state) 554, a step (or state) 556, a step (or state) 558, a step (or state) 560, a decision step (or state) 562, a step (or state) 564, a step (or state) 566, a step (or state) 568, a decision step (or state) 570, and a step (or state) 572.

The step 552 may start the method 550. In the step 554, the disparity engine 190c may determine the center pixel peak location 298 for the guide node 278. Next, the method 550 may move to the step 556.

In the step 556, the disparity engine 190c may select a next one of the surrounding pixels 274a-274x within the guide node 278. Next, in the step 558, the disparity engine 190c may select the local search range 284 near the center pixel peak location 298 (e.g., near the same X value for a horizontal stereo camera or near the same Y value for a vertical stereo camera) for the selected one of the surrounding pixels 274a-274x. In the step 560, the disparity engine 190c may perform block matching operations between the surrounding pixel block 276 and one of the locations 350a-350c of the local search range 284. Next, the method 550 may move to the decision step 562.

In the decision step 562, the disparity engine 190c may determine whether three block matching operations have been performed for the surrounding pixel block 276. For example, the disparity engine 190c may generate matching scores for each of the three locations 350a-350c. If the three block matching operations have not been performed, then the method 550 may return to the step 560 and determine a matching score for the next one of the locations 350a-350c of the local search range 284. If all three of the block matching operations have been performed, then the method 550 may move to the step 564.

In the step 564, the disparity engine 190c may use the block matching scores 310a-310c generated from the block matching operations performed at the three locations 350a-350c to determine coefficients to define the paracurve 306. Next, in the step 566, the disparity engine 190c may calculate the peak value 312 of the paracurve 306 (e.g., based on the equation EQ2). In the step 568, the disparity engine 190c may use the peak value 312 of the paracurve as the shift offset peak location for the selected one of the surrounding pixels 274a-274x. Next, the method 550 may move to the decision step 570.

In the decision step 570, the disparity engine 190c may determine whether there are more of the surrounding pixels 274a-274x in the guide node 278. If there are more of the surrounding pixels 274a-274x (e.g., more disparity values need to be determined), then the method 550 may return to the step 556. If there are no more of the surrounding pixels 274a-274x (e.g., the disparity values have been determined for all the pixels in the guide node 278), then the method 550 may move to the step 572. The step 572 may end the method 550. For example, all of the pixels in the current guide node 278 may be calculated, and the guide node may be moved to another one of the guide node locations 382a-382n.

Figure 13:
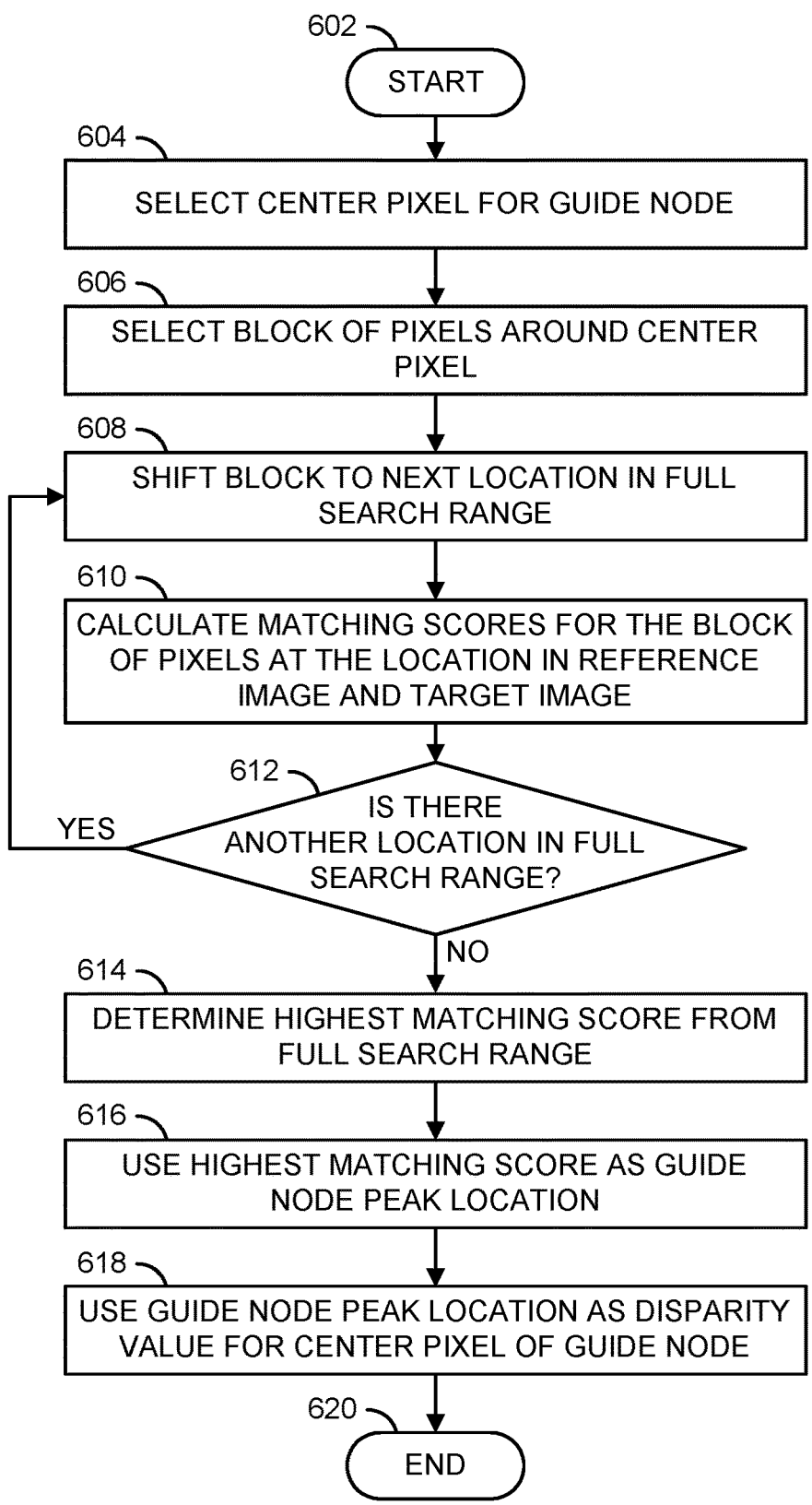
FIG. 13 is a flow diagram illustrating a method for calculating a disparity value for a center pixel.

Referring to FIG. 13, a method (or process) 600 is shown. The method 600 may calculate a disparity value for a center pixel. The method 600 generally comprises a step (or state) 602, a step (or state) 604, a step (or state) 606, a step (or state) 608, a step (or state) 610, a decision step (or state) 612, a step (or state) 614, a step (or state) 616, a step (or state) 618, and a step (or state) 620.

The step 602 may start the method 600. In the step 604, the disparity engine 190c may select the center pixel 270 of the guide node 278. Next, in the step 606, the disparity engine 190c may select a block of pixels around the center pixel 270 (e.g., the center pixel block 272). For example, the center pixel block 272 may comprise the center pixel 270 and a subset of the surrounding pixels 274a-274x. Next, the method 600 may move to the step 608.

In the step 608, the disparity engine 190c may shift the center pixel block 272 to a next location in the full search range 280. For example, the disparity engine may start with the center pixel block 272 at a leftmost location (or rightmost location) in the full search range 280 and shift the center pixel block 272 from left to right (or right to left) across the entire full search range 280. Next, in the step 610, the disparity engine 190c may calculate matching scores for the center pixel block 272 at the location in the reference image 200a and the corresponding location in the target image 200b. Next, the method 600 may move to the decision step 612.

In the decision step 612, the disparity engine 190c may determine whether there is another location in the full search range 280. If there are more locations in the full search range 280, then the method 600 may return to the step 608. For example, the disparity engine 190c may determine the matching scores for every location in the full search range 280. If there are not more locations in the full search range 280 (e.g., a matching score has been generated for every location so that the curve 296 may be generated), then the method 600 may move to the step 614.

In the step 614, the disparity engine 190c may determine the highest matching score generated over the full search range 280. The highest matching score may be the highest value in the curve 296. Next, in the step 616, the disparity engine 190c may use the highest matching score as the guide node peak location 298. In the step 618, the disparity engine 190c may use the guide node peak location 298 as the disparity value for the center pixel 270 of the guide node 278. Next, the method 600 may move to the step 620. The step 620 may end the method 600. For example, after the guide node pixel peak location 298 has been determined, the disparity module 190c may calculate the disparity values for the surrounding pixels 274a-274x as described in association with FIG. 12.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data; and
a processor configured to (i) generate a reference image and a target image from said pixel data, (ii) perform disparity operations on said reference image and said target image and (iii) build a disparity map in response to said disparity operations, wherein said disparity operations comprise (a) selecting a guide node from said pixel data comprising a guide node pixel and a plurality of surrounding pixels, (b) determining a guide node pixel peak location for said guide node pixel by performing a full range search in said reference image and said target image, (c) calculating a shift offset peak location for each of said surrounding pixels in said guide node by performing block matching operations in a local range near said guide node pixel peak location and (d) generating values in said disparity map for said pixel data in said guide node in response to (i) said guide node pixel peak location for said guide node pixel and (ii) said shift offset peak location for each of said surrounding pixels.

2. The apparatus according to claim 1, wherein said shift offset peak location for said surrounding pixels is determined in response to (i) selecting said local range near said guide node pixel peak location, (ii) generating coefficients in response to said block matching operations at three locations in said local range by comparing blocks of said pixel data near one of said surrounding pixels in said reference image and said target image, (iii) calculating said shift offset peak location in response to said coefficients and (iv) repeating (i)-(iii) for each of said surrounding pixels.

3. The apparatus according to claim 2, wherein (i) said coefficients define a paracurve and (ii) said shift offset peak location is determined in response to calculating a peak location of said paracurve.

4. The apparatus according to claim 1, wherein said full range search comprises (i) shifting locations of a block of pixels comprising said guide node pixel across a search range, (ii) calculating one of a plurality of matching scores for one of a plurality of locations of said block of pixels comprising said guide node pixel in said reference image and a corresponding location in said target image, (iii) repeating (i)-(ii) for each of said plurality of locations in said search range and (iv) selecting a highest value from said matching scores as said guide node pixel peak location.

5. The apparatus according to claim 4, wherein said local range is smaller than said search range.

6. The apparatus according to claim 1, wherein said disparity operations are configured to generate said disparity map in less time than using said block matching operations over a full video frame and with fewer mismatches than semi-global block matching operations.

7. The apparatus according to claim 1, wherein said disparity operations are configured to build said disparity map at a sub-pixel level of accuracy.

8. The apparatus according to claim 1, wherein said disparity operations comprise post-processing to prevent waveform distortions in said disparity map.

9. The apparatus according to claim 8, wherein said post-processing comprises implementing a paracurve in order to calculate a matching location.

10. The apparatus according to claim 1, wherein said disparity operations are configured to generate said disparity map at least 20 times faster than using said block matching operations over a full video frame.

11. A method for determining disparity values from stereo images, comprising the steps of:
receiving pixel data at an interface;
generating a reference image and a target image from said pixel data using a processor;
performing disparity operations using said processor on said reference image and said target image; and
building a disparity map in response to said disparity operations using said processor, wherein said disparity operations comprise (a) selecting a guide node from said pixel data comprising a guide node pixel and a plurality of surrounding pixels, (b) determining a guide node pixel peak location for said guide node pixel by performing a full range search in said reference image and said target image, (c) calculating a shift offset peak location for each of said surrounding pixels in said guide node by performing block matching operations in a local range near said guide node pixel peak location and (d) generating values in a said disparity map for said pixel data in said guide node in response to (i) said guide node pixel peak location for said guide node pixel and (ii) said shift offset peak location for each of said surrounding pixels.

12. The method according to claim 11, wherein said shift offset peak location for said surrounding pixels is determined in response to said processor performing the steps of:
(i) selecting said local range near said guide node pixel peak location,
(ii) generating coefficients in response to said block matching operations at three locations in said local range by comparing blocks of said pixel data near one of said surrounding pixels in said reference image and said target image,
(iii) calculating said shift offset peak location in response to said coefficients, and
(iv) repeating (i)-(iii) for each of said surrounding pixels.

13. The method according to claim 12, wherein (i) said coefficients define a paracurve and (ii) said shift offset peak location is determined in response to calculating a peak location of said paracurve.

14. The method according to claim 11, wherein said full range search comprises said processor performing the steps of:
(i) shifting locations of a block of pixels comprising said guide node pixel across a search range,
(ii) calculating one of a plurality of matching scores for one of a plurality of locations of said block of pixels comprising said guide node pixel in said reference image and a corresponding location in said target image,
(iii) repeating (i)-(ii) for each of said plurality of locations in said search range, and
(iv) selecting a highest value from said matching scores as said guide node pixel peak location.

15. The method according to claim 14, wherein said local range is smaller than said search range.

16. The method according to claim 11, wherein said disparity operations are configured to generate said disparity map in less time than using said block matching operations over a full video frame and with fewer mismatches than semi-global block matching operations.

17. The method according to claim 11, wherein said disparity operations are configured to build said disparity map at a sub-pixel level of accuracy.

18. The method according to claim 11, wherein said disparity operations comprise post-processing to prevent waveform distortions in said disparity map.

19. The method according to claim 18, wherein said post-processing comprises implementing a paracurve in order to calculate a matching location.

20. The method according to claim 11, wherein said disparity operations are configured to generate said disparity map at least 20 times faster than using said block matching operations over a full video frame.

* * * * *